United States Patent
Fujiwaka

(10) Patent No.: US 10,019,216 B2
(45) Date of Patent: Jul. 10, 2018

(54) INFORMATION PROCESSING TERMINAL AND CONTROL METHOD THEREOF

(75) Inventor: Masaya Fujiwaka, Minato-ku (JP)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 1033 days.

(21) Appl. No.: 13/583,160

(22) PCT Filed: Mar. 29, 2011

(86) PCT No.: PCT/JP2011/057743
§ 371 (c)(1),
(2), (4) Date: Sep. 6, 2012

(87) PCT Pub. No.: WO2011/125635
PCT Pub. Date: Oct. 13, 2011

(65) Prior Publication Data
US 2012/0326947 A1 Dec. 27, 2012

(30) Foreign Application Priority Data
Apr. 7, 2010 (JP) .................................. 2010-088552

(51) Int. Cl.
*G06F 3/14* (2006.01)
*G06F 9/50* (2006.01)

(52) U.S. Cl.
CPC .......... *G06F 3/1423* (2013.01); *G06F 9/5094* (2013.01); *G09G 2330/021* (2013.01); *G09G 2360/04* (2013.01); *Y02D 10/22* (2018.01)

(58) Field of Classification Search
None
See application file for complete search history.

(56) References Cited

U.S. PATENT DOCUMENTS

| | | | |
|---|---|---|---|
| 7,043,276 B2 | 5/2006 | Kokubo | |
| 7,123,945 B2 | 10/2006 | Kokubo | |
| 7,801,551 B2 | 9/2010 | Lee | |
| 8,106,887 B2 | 1/2012 | Park et al. | |
| 8,300,022 B2 * | 10/2012 | Brenneman et al. | 345/173 |
| 2001/0022590 A1 | 9/2001 | Banno | |
| 2004/0196210 A1* | 10/2004 | Nagatsuka et al. | 345/1.1 |
| 2004/0261077 A1 | 12/2004 | Kozaki et al. | |

(Continued)

FOREIGN PATENT DOCUMENTS

| | | |
|---|---|---|
| JP | 10-198505 A | 7/1998 |
| JP | 2002331724 A | 11/2002 |

(Continued)

OTHER PUBLICATIONS

European Search Report dated Oct. 8, 2013, issued by the European Patent Office in corresponding European Application No. 11765535.7.

(Continued)

*Primary Examiner* — Kent Chang
*Assistant Examiner* — Sujit Shah
(74) *Attorney, Agent, or Firm* — Kunzler, PC

(57) ABSTRACT

An information processing terminal includes a plurality of displays, each displaying an application screen, and control means. The control means determines a display on which a new application is to be started from the plurality of displays on the basis of the amount of the resources consumed by the information processing terminal.

12 Claims, 15 Drawing Sheets

(56) References Cited

U.S. PATENT DOCUMENTS

| | | | |
|---|---|---|---|
| 2005/0034129 A1 | 2/2005 | Chew | |
| 2005/0044205 A1 | 2/2005 | Sankaranarayan et al. | |
| 2006/0187142 A1* | 8/2006 | Lesniak | 345/1.1 |
| 2007/0005926 A1 | 1/2007 | Kim | |
| 2007/0182663 A1* | 8/2007 | Biech | 345/1.1 |
| 2008/0068292 A1* | 3/2008 | Yuan et al. | 345/2.1 |
| 2009/0085920 A1* | 4/2009 | Teng et al. | 345/520 |
| 2010/0122257 A1* | 5/2010 | Wada | 718/102 |

FOREIGN PATENT DOCUMENTS

| | | | | |
|---|---|---|---|---|
| JP | 2003-162354 A | | 6/2003 | |
| JP | 2003162354 A | * | 6/2003 | G06F 3/00 |
| JP | 2004078936 A | | 3/2004 | |
| JP | 2005252969 A | | 9/2005 | |
| JP | 2006084531 A | | 3/2006 | |
| JP | 2006279381 A | | 10/2006 | |
| JP | 2008117181 A | | 5/2008 | |
| JP | 2008-186167 A | | 8/2008 | |
| JP | 2008186168 A | | 8/2008 | |
| JP | 4296175 B2 | | 7/2009 | |
| WO | 03077098 A1 | | 9/2003 | |
| WO | 2008042813 A2 | | 4/2008 | |
| WO | 2008091008 A1 | | 7/2008 | |
| WO | 2008134559 A1 | | 11/2008 | |
| WO | 2010023353 A1 | | 3/2010 | |

OTHER PUBLICATIONS

Communication dated Aug. 5, 2014 from The State Intellectual Property of the People's Republic of China in counterpart Chinese Patent Application No. 201180016970.5.

* cited by examiner

INFORMATION PROCESSING TERMINAL AND CONTROL METHOD THEREOF

CROSS REFERENCE TO RELATED APPLICATIONS

This application is a National Stage of International Application No. PCT/JP2011/057743, filed on Mar. 29, 2011, which claims priority from Japanese Patent Application No. 2010-088552, filed on Apr. 7, 2010, the contents of all of which are incorporated herein by reference in their entirety.

TECHNICAL FIELD

The present invention relates to an information processing terminal provided with a plurality of displays.

BACKGROUND ART

Information processing terminals such as mobile phones, personal digital assistants, personal computers and the like include an information processing terminal provided with two displays. Some of those information processing terminals are capable of individually displaying each of a plurality of applications in each of the displays (See Patent Literature 1). If the two applications are activated simultaneously and an application screen is displayed for each of the two displays, it is highly convenient when a user uses the two applications at the same time or alternately.

Moreover, Patent Literature 2 discloses a technology relating to a method of using a resource in parallel processing by an information processing terminal. According to the technology disclosed in Patent Literature 2, the terminal records whether or not each of its own resources is in use. When a new task is to be started, if a resource required for the task has been already used by another task, the terminal determines which task uses the resource or an alternative resource if there is one.

CITATION LIST

Patent Literature

Patent Literature 1: JP 10-198505 A
Patent Literature 2: JP 4296175 B

SUMMARY OF INVENTION

In an information processing terminal capable of executing two applications by using two displays, a resource shared by a CPU (Central Processing Unit), memory and the like might be largely consumed by the applications.

Usually, an application whose application screen is displayed on the surface of the display is in a state where a large quantity of resources are consumed in order to input a user operation or to execute processing. On the other hand, the application whose application screen is not displayed on the surface of the display does not consume many resources, though the application has been activated and is being executed. Alternatively, such an application might be kept in a non-active state where resource consumption, such as resource used by a memory area, is reduced.

Therefore, when the applications are individually displayed on the two displays, the information processing terminal executes the two applications at the same time and thus, more resources are consumed as compared with an information processing terminal including one display screen. As a result, nonconformities may occur, such as reduction in the operation speed of the application, an application that does not operate normally, the forcedly shutdown of an application and the like.

Using a file access as an example, there can be a case where a file access that occurs when virtual memory is full due to processing by an application may compete with a normal file access from another application.

As described above, Patent Literature 2 discloses the technology relating to the method of using a resource in parallel processing by the information processing terminal but it has problems as illustrated in (1) to (3).

(1) Patent Literature 2 describes a method of determining a display on which a new application is to be activated in accordance with the usage of a resource. However, the method described in Patent Literature 2 individually determines the plurality of resources, and has a problem in which the display on which a new application is to be activated cannot be determined by simultaneously taking account of a plurality of conditions.

(2) Patent Literature 2 describes a method of determining a display on which a new application is to be activated in accordance with the usage of a resource. However, the method described in Patent Literature 2 makes determination according to whether or not the resource is currently used. Thus, it has a problem in which a display on which a new application is to be activated cannot be determined when taking into consideration the size of a load applied to the information processing terminal.

(3) Patent Literature 2 describes a method of finishing an application that is being executed or of activating a new application on an alternative display if a display required by the new application to be activated is used by the application that is being executed. However, it has a problem that, if characteristics of displays are different, the new application cannot be activated on the display having a characteristic requested by the application while the application that is being executed is maintained.

The present invention has an object to provide a technology which solves at least one of the above-described problems (1) to (3).

In order to solve the above-described problems, an information processing terminal according to one aspect of the present invention includes a plurality of displays that respectively displays an application screen, and control means that determines a display on which the new application is to be activated from the plurality of displays on the basis of the amount of resources consumed by the information processing terminal.

A method of controlling an information processing terminal according to one aspect of the present invention is a method of controlling an information processing terminal provided with a plurality of displays that respectively displays an application screen, and which determines a display on which the new application is to be activated from the plurality of displays on the basis of the amount of resources consumed by the information processing terminal.

DESCRIPTION OF EMBODIMENTS

Exemplary embodiments will be described in detail by referring to the attached drawings.

First, a basic configuration and operation in common to each of the exemplary embodiments will be described.

Figure 1:
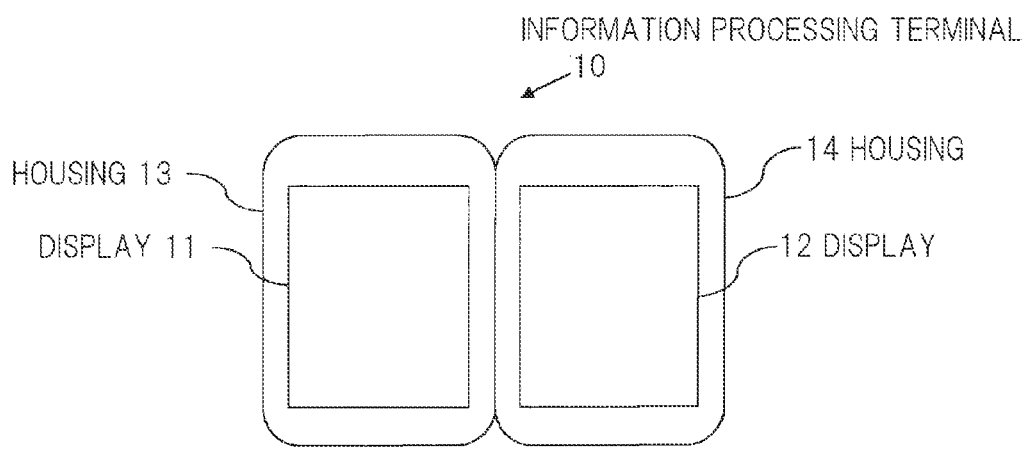
FIG. 1 is a front view of an information processing terminal according to an exemplary embodiment.

FIG. 1 is a front view of an information processing terminal according to an exemplary embodiment. Information processing terminal 10 of the exemplary embodiment is a personal digital assistant provided with a communication function as an example and is formed of two housings 13 and 14 that are connected and that are capable of being opened/closed, and each of housings 13 and 14 is provided with displays 11 and 12, respectively. Two displays 11 and 12 are arranged so that their display surfaces are directed to the same direction and they enter the view of a user at the same time in a state where housing 13 and housing 14 are opened. However, information processing terminal 10 provided with displays 11 and 12 in two housings 13 and 14, respectively, does not have to be an opening/closing type but may have any other configuration. As another example, the information processing terminal may be a sliding type in which two housings 13 and 14 are connected slidably with respect to each other or two housings 13 and 14 may be separable from each other.

First, an outline of information processing terminal 10 will be described.

Figure 2:
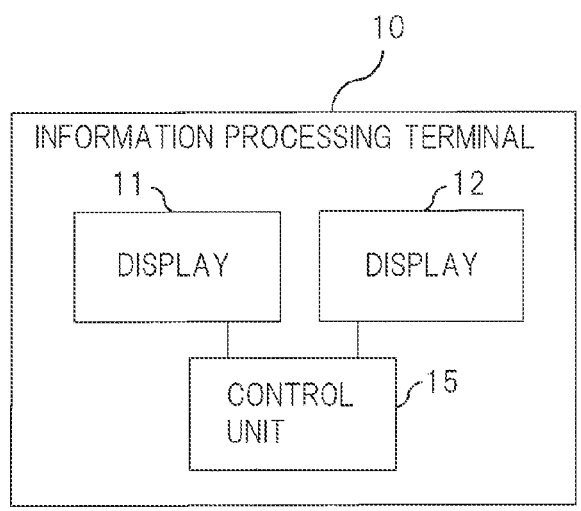
FIG. 2 is a functional block diagram of the information processing terminal according to the exemplary embodiment.

FIG. 2 is a functional block diagram of the information processing terminal according to the exemplary embodiment. By referring to FIG. 2, information processing terminal 10 has displays 11 and 12 and control unit 15.

Displays 11 and 12 are display devices such as a liquid crystal for displaying an application screen, respectively.

Control unit 15 is a processor which executes processing of various applications and displays the application screen of an application that is being executed on displays 11 and 12. Control unit 15 may include a CPU that carries out various kinds of application processing or the like and a GPU (Graphics Processing Unit) that carries out processing of image display on displays 11 and 12.

Control unit 15 is capable of executing two applications in parallel and displaying the application screens thereof on displays 11 and 12, respectively.

Moreover, control unit 15 can execute a plurality of applications so that they are displayed on one display in a superimposed manner. In that case, control unit 15 considers the intention of a user and displays the application screen of an application immediately after it is activated on the most front (surface) of the display.

Figure 3:
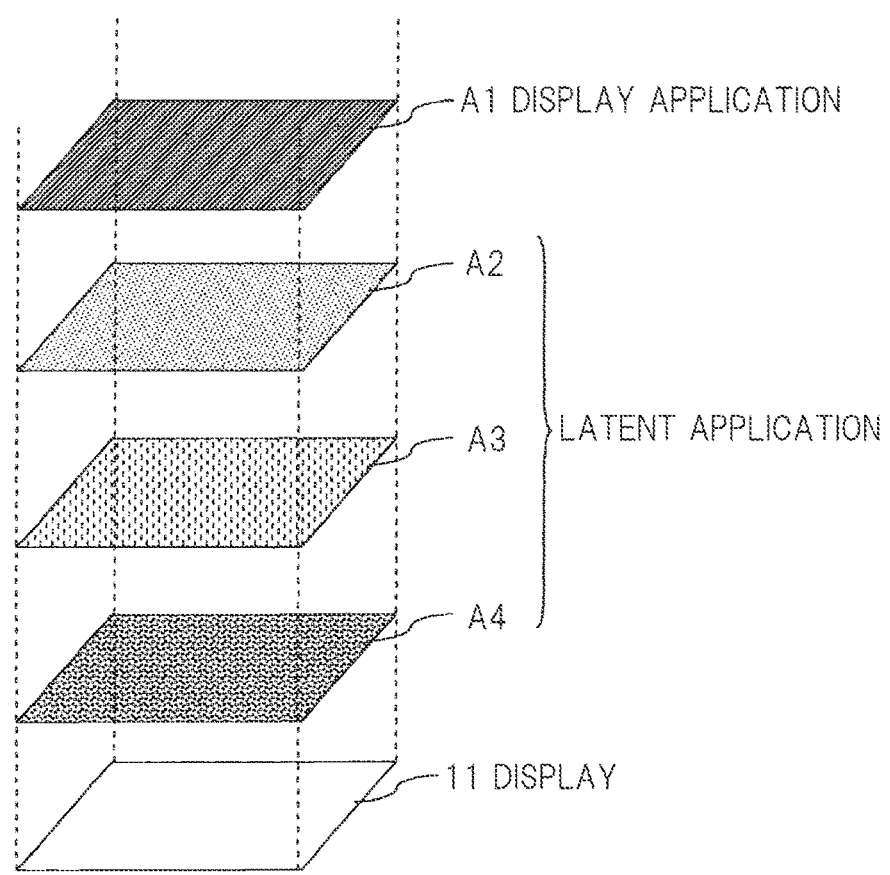
FIG. 3 is a conceptual diagram illustrating an example if a plurality of applications are executed on one display.

FIG. 3 is a conceptual diagram illustrating an example of a plurality of applications that are executed on one display. FIG. 3 illustrates an example in which four applications A1 to A4 are executed on display 11. The application screen of application A1 is actually displayed on display 11, and applications A2 to A4 are executed but the application screens are not seen. Application A1 in this state is referred to as a display application, while applications A2 to A4 are referred to as latent applications. Moreover, latent applications A2 to A4 have a hierarchy (rank). The hierarchy becomes deeper from latent application A2 which is the closest to display application A1 toward latent application A4 which is the farthest from display application A1. If display application A1 is finished, for example, latent application A2 of the highest order newly becomes the display application.

The display application consumes a large quantity of resources since a user operation is inputted and processing is frequently executed. On the other hand, the latent applications basically consume smaller resources. Moreover, control unit 15 may bring the latent applications into a non-active state in which the consumption of the resources is intentionally reduced.

The resources here are physical or virtual resources used for execution of the application and owned by information processing terminal 10. The resources include a type of resources that can take an intermediate consumption amount such as the processing capability of the CPU or the GPU, the memory capacity, the communication throughput, the electric power or the number of channels, and a type of resources for which presence or absence of use is fixed (a type exclusively owned by one application) such as a device of a camera, a GPS, a sensor or a communication device, for example. When the application is executed, the resource is used by the application.

Control unit 15 determines on which display the application screen of a new application is to be displayed when the new application is to be activated.

Details of each exemplary embodiment will be described below.

First Exemplary Embodiment

As a first exemplary embodiment, a case assuming only the type of resources that can take an intermediate consumption amount will be exemplified. Examples of the resources that can take an intermediate consumption amount include the processing capability of the CPU, the memory capacity, communication throughput, the number of channels, electric power and the like.

A basic configuration of information processing terminal 10 of the first exemplary embodiment is a configuration illustrated in FIG. 2.

Figure 4:
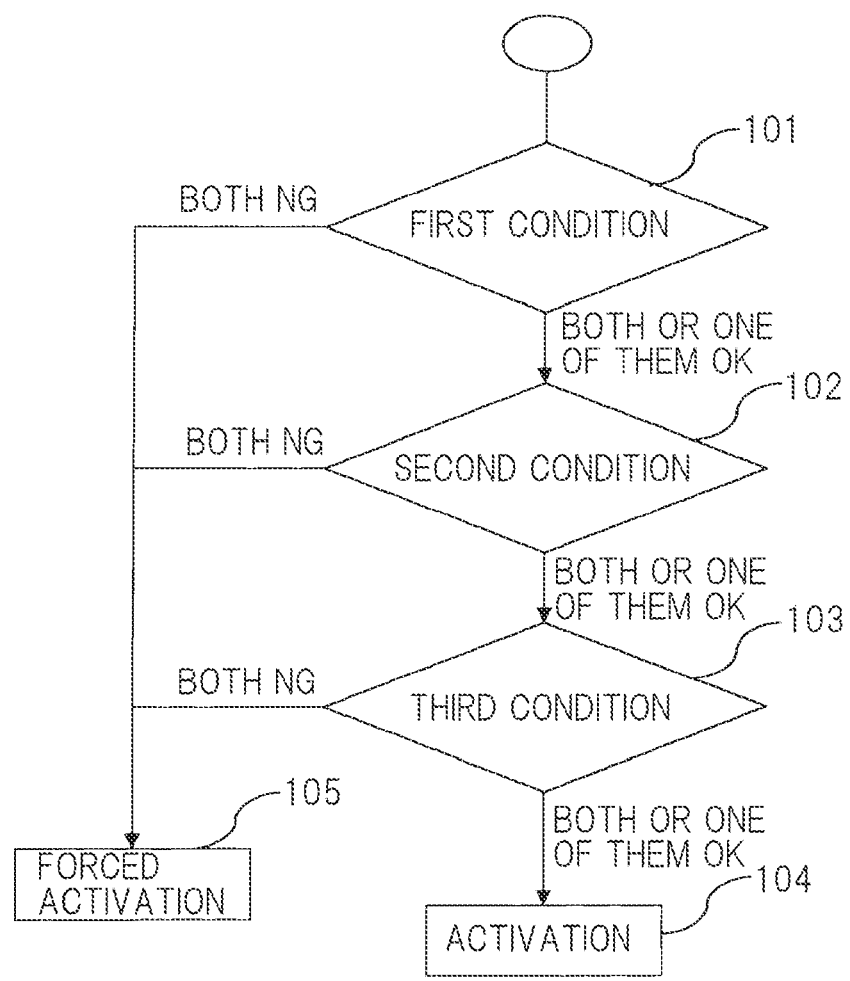
FIG. 4 is a flowchart illustrating screen display control of the application by information processing terminal 10 of a first exemplary embodiment.

FIG. 4 is a flowchart illustrating screen display control of the application by information processing terminal 10 of the first exemplary embodiment. The processing of this screen display control is executed mainly by control unit 15.

Information processing terminal 10 of this exemplary embodiment has a plurality of displays 11 and 12, each displaying a screen of an application, and control unit 15 which determines the display on which the new application is to be activated from the plurality of displays 11 and 12 on the basis of the amount of resources consumed by information processing terminal 10. Therefore, information terminal 10 of this exemplary embodiment can determine the display on which the new application is to be activated by considering the load applied to the information processing terminal. Detailed description will be given below.

In the initial state in FIG. 4, some application may be already in execution or an application does not have to be executed at all.

By referring to FIG. 4, upon the receipt of instructions to activate a new application, information processing terminal 10 determines whether or not the new application can be activated on display 11, can be activated on display 12 or cannot be activated on either of them based on a first condition (Step 101). The first condition here is a condition that, if a new application is to be activated on one of the displays, the total sum of the statistic amount of resources that were consumed by an application in the past and the current amount of resources that are consumed by an application that is being executed on the surface of the other display, does not exceed a predetermined threshold value. The statistic amount of resources that are consumed is an average value of the amount of resources that were consumed in the past execution as an example. If the application is not to be activated due to the amount of resources that are consumed by the application that is being executed in real-time, it is determined that activation is not possible by this first condition.

If it is determined that the application can be activated on one of or both of displays 11 and 12, information processing terminal 10 further determines whether or not the new application can be activated further on a second condition for the display on which it is determined that the application can be activated (Step 102).

The second condition here is a condition that, if the new application is to be activated on the display which satisfies the first condition, the total sum of the statistic amount of resources that were consumed by the new application in the past and the amount of resources that were consumed by an application that is being executed on the surface of the other display in the past, does not exceed the predetermined threshold value. For example, the statistic amount of the resources consumed by the application is an average value of the amount of resources consumed by the application in the past execution. Assuming that the application that is being executed is implemented consuming an average amount of resource, if the application is not to be activated, it is determined that the activation is not possible based on this second condition.

If it is also determined that the application can be activated on one of or both of displays 11 and 12 based on the second condition, information processing terminal 10 determines whether or not the new application can be activated further based on a third condition for the display on which it is determined that the application can be activated (Step 103).

The third condition here is a condition that when a display application on the other display is finished after the new application is activated on either display 11 or 12, the total sum of the amount of resources consumed by the applications on the surfaces of two displays 11 and 12 does not exceed the threshold value. If a problem is assumed to occur in the entire amount of resources when the applications on the surfaces of displays 11 and 12 are finished in the future and the applications below them come to the front, it is determined that activation is not possible in this third condition.

If it is determined that the application can be activated on either one of or on both of displays 11 and 12 in the third condition, information processing terminal 10 activates the application on the display on which it is determined that the application can be activated (Step 104). As a result, the application can be activated giving priority to the display that satisfies all the first to third conditions. If a new application is activated on display 11, for example, the display application so far on display 11 becomes a latent application of the highest order. If an application becomes the latent application, the real-time amount of resources consumed by the application decreases.

If it is determined that the application can be activated on both of displays 11 and 12 in the third condition, information processing terminal 10 arbitrarily selects either display 11 or 12 and may activate the application on the selected display. However, this is one example, and determination may be made based on further conditions as another example. Specifically, if there is a difference in the amount of resources consumed between the activation of the new application on display 11 and the activation of the new application on display 12, the display that consumes a smaller amount of resources may be selected.

If it is determined at any one of Steps 101 to 103 that the application cannot be activated on either display 11 or 12, information processing terminal 10 executes forced activation processing (Step 105). The forced activation processing is processing in which the requested new application is activated while the state of the application that is being executed is controlled so that the total of the amount of resources that are consumed is reduced. The details of the forced activation processing will be described later. However, as another example, execution of the forced activation processing is one example, and as another example, if it is determined that the application cannot be activated on either display 11 or 12 at any one of Steps 101 to 103, information processing terminal 10 may determine that the new application is not to be activated.

Figure 5:
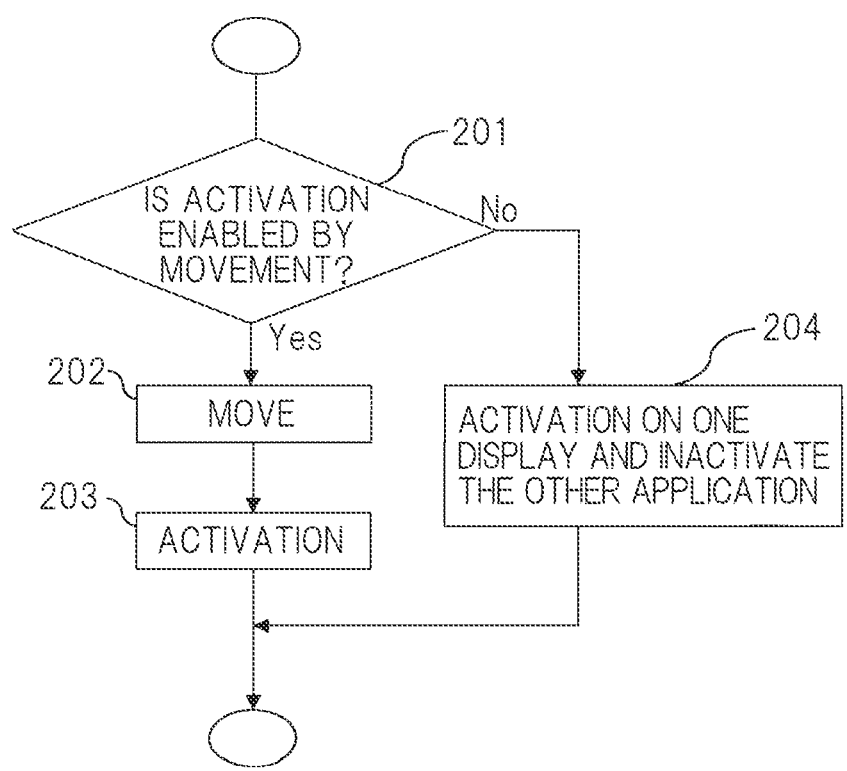
FIG. 5 is a flowchart illustrating forced activation processing by the information processing terminal of this exemplary embodiment.

FIG. 5 is a flowchart illustrating the forced activation processing by the information processing terminal of this exemplary embodiment. This forced activation processing is executed if it is determined in the flowchart in FIG. 4 that the new application cannot be activated on either display 11 or 12.

By referring to FIG. 5, information processing terminal 10 first determines whether or not the new application can be activated on either one of the displays if the application that is being executed is moved between displays 11 and 12 (Step 201). The movement of the application that is being executed between displays 11 and 12 means that the display on which the application screen of the application is displayed is changed from display 11 to display 12 or from display 12 to display 11. If the application that is being executed is moved between displays 11 and 12, the display applications and the latent applications of two displays 11 and 12 are changed, and the entire amount of resources that are consumed is changed.

By moving the application that is being executed between displays 11 and 12, if the new application can be activated on either one of the displays as the result of the change in the entire amount of resources that are consumed, information processing terminal 10 moves the application that is being executed as such (Step 202) and activates the new application (Step 203).

If the new application cannot be activated even after the application that is being executed is moved between displays 11 and 12, information processing terminal 10 activates the new application on one of the displays and brings the display application on the other display into the inactive state (Step 204).

The inactive state here refers to a state in which the amount of resources that are consumed is reduced while execution is maintained. If an application is brought into the inactive state, the memory region that is allocated for the application may be released, for example. Alternatively, information processing terminal 10 may activate a dummy application in which zero amount of resources that are consumed on the display of the application so as to bring the display application into the inactive state. As a result, the display application becomes a latent application, and the amount of resources that are consumed is reduced. At that time, information processing terminal 10 may darken the application screen of the application brought into the inactive state or thumbnail it.

Moreover, in the example in FIG. 5, if the new application cannot be activated even after the application that is being executed is moved between displays 11 and 12, the application on the surface of the display on which the new application is not to be displayed is brought into the inactive state, but the present invention is not limited to this. As another example, the new application may be displayed on either one of them, and the application on the surface of the other display may be brought into the inactive state, without determining on the case where the application that is being executed is moved between displays 11 and 12.

Moreover, in this exemplary embodiment, as illustrated in FIG. 4, the example in which the determination is made on all the first to third conditions is shown, but the present invention is not limited to this. The determination may be made only on any one of the first to third conditions as another example. As still another example, the determination may be made on any two of the first to third conditions.

Moreover, in this embodiment, as illustrated in FIG. 4, the example in which the first to third conditions are used in this order is shown, but the present invention is not limited to this, and the first to third conditions may be used in an arbitrary order.

Second Exemplary Embodiment

As the first exemplary embodiment, the case assuming only the resources whose consumption amounts can be measured such as the processing capability of the CPU and the memory capacity was exemplified, but in a second exemplary embodiment, a case assuming only a type of resources for which presence or absence of use is fixed such as a camera and a sensor will be exemplified. This type of resources will be referred to as devices here.

In the second exemplary embodiment, information processing terminal 10 selects a display on which a new application is to be activated so that the display applications of two displays 11 and 12 do not use the same device lest the plurality of applications use the same device at the same time.

In the second exemplary embodiment, too, a basic configuration of information processing terminal 10 is the configuration illustrated in FIG. 2.

Figure 6:
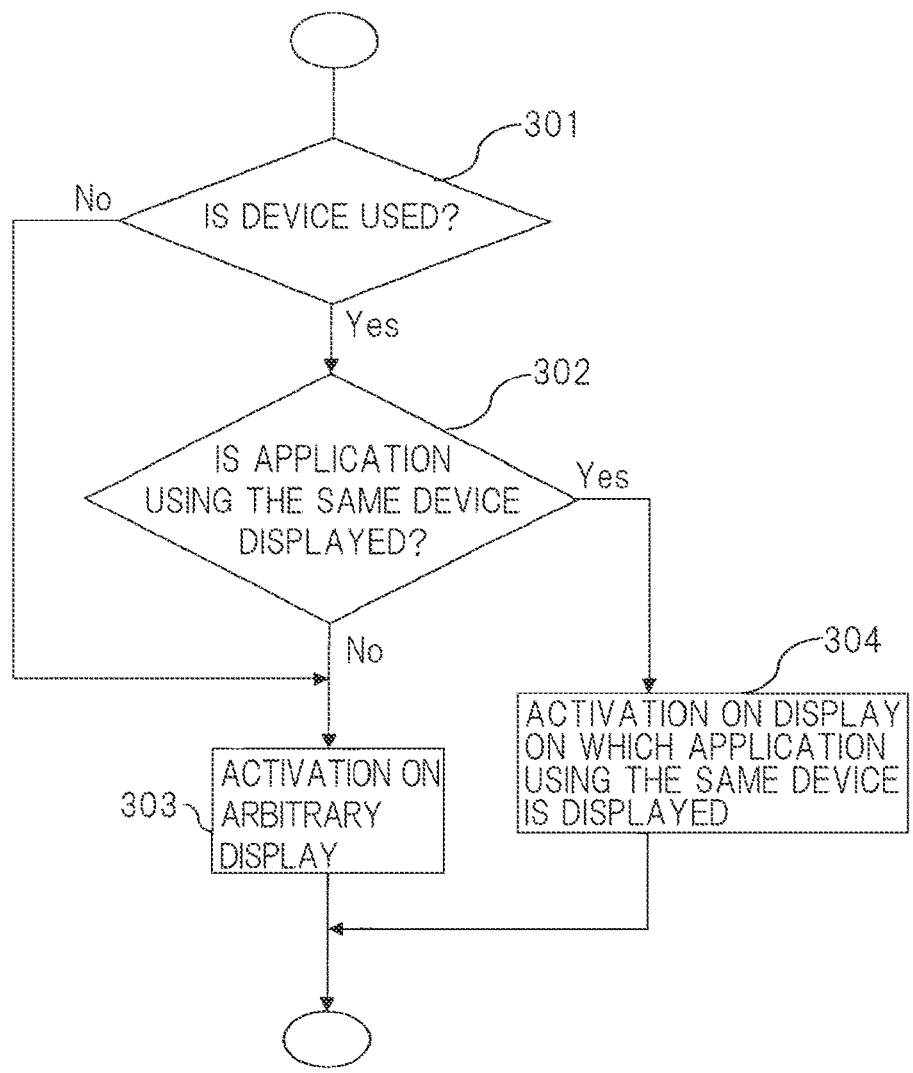
FIG. 6 is a flowchart illustrating screen display control of the application by information processing terminal 10 of a second exemplary embodiment.

FIG. 6 is a flowchart illustrating the screen display control of the application by information processing terminal 10 of the second exemplary embodiment. The processing of this screen display control is executed mainly by control unit 15. In an initial state in FIG. 6, some application may already be in execution or an application does not have to be executed at all.

By referring to FIG. 6, upon receipt of instruction to activate a new application, information processing terminal 10 determines whether or not the new application uses a device (Step 301). If the new application uses the device, information processing terminal 10 determines whether or not the application using the same device as the device to be used by the new application is displayed as the display application on display 11 or 12 (Step 302).

If it is determined at Step 301 that the new application does not use the device or if it is determined at Step 302 that the application using the same device as that of the new application is not displayed, information processing terminal 10 activates the new application on the display arbitrarily selected from displays 11 and 12 (Step 303).

If it is determined at Step 302 that the application using the same device as that of the new application is displayed on either one of the displays, information processing terminal 10 activates the new application on that display (Step 304). As a result, a plurality of the applications using the same device will not become the display application at the same time.

It is assumed here that there is no competition with other applications and the application that cannot be activated on either display 11 or 12 is not installed. Moreover, as the initial state, it is assumed that the two applications that use the same device are not the display applications of displays 11 and 12, respectively. Thus, in FIG. 6, it is assumed that the new application can be activated at least on either one of the displays without fail.

In this exemplary embodiment, regarding a type of resources for which presence or absence of use is fixed such as a camera, a possibility that the application uses the resource may be quantified and used for determining selection of a display on which the new application is to be activated. A variation of this exemplary embodiment will be described below.

Figure 7:
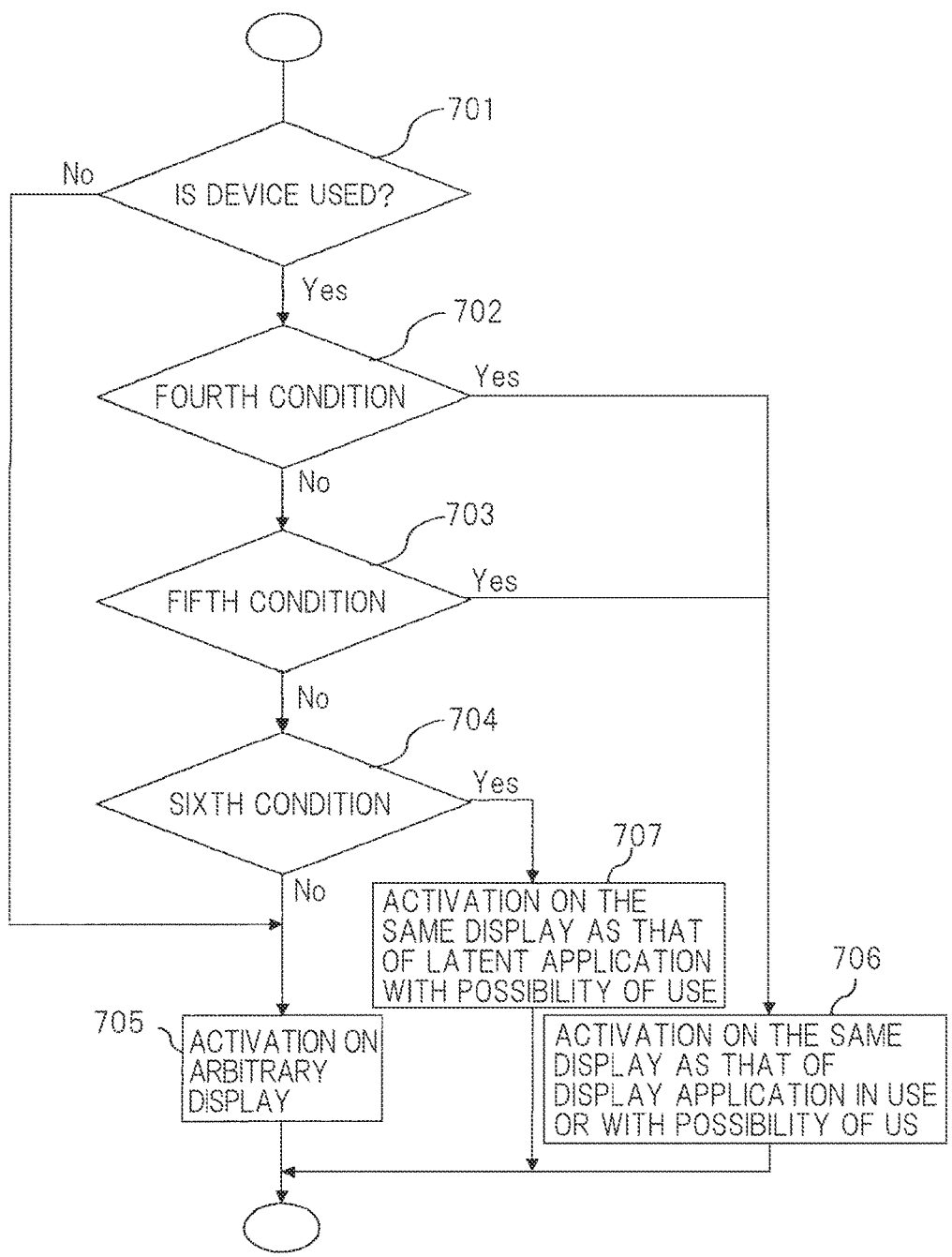
FIG. 7 is a flowchart illustrating screen display control of the application by information processing terminal 10 of a variation of the second exemplary embodiment.

FIG. 7 is a flowchart illustrating the screen display control of the application by information processing terminal 10 according to the variation of the second exemplary embodiment. The processing of this screen display control is executed mainly by control unit 15. In an initial state in FIG. 7, some application may already be in execution or an application does not have to be executed at all.

By referring to FIG. 7, upon the receipt of instructions to activate a new application, information processing terminal 10 determines whether or not there is a possibility that the new application uses the device (Step 701). The possibility that the application uses the device here is expressed by a usage rate obtained by dividing the number of times that the application is executed and the device that is used by the number of times that the application is executed. The fact that there is a possibility that the application uses the device means that the usage rate exceeds a threshold value. The threshold value is zero, for example.

If the new application has a possibility to use the device, information processing terminal 10 determines whether or not the device to be used by the new application is being used by either one of the display applications at the current time as a fourth condition (Step 702).

If the device to be used by the new application is not being used by either of the display applications at the current time, information processing terminal 10 determines whether or not the application having a possibility to use the device is a display application of either one of the displays (Step 703) as a fifth condition. If the application having the possibility to use the device is not the display application of either one of the displays, information processing terminal 10 determines whether or not the application having a possibility to use the device is a latent application of either one of the displays further as a sixth condition (Step 704).

The fact that there is a possibility that the latent application uses the device means that there is a possibility that the application uses the device as the latent application or there is a possibility that the application uses the device when it becomes the display application.

If it is determined at Step 701 that there is no possibility that the new application uses the device, or if it is determined at Step 704 that there is no latent application in which there is a possibility to use the device that is to be used by the new application, information processing terminal 10 activates the new application on the arbitrarily selected display (Step 705).

If it is determined at Step 702 that there is a display application which is using the device that is to be used by the new application at the current time, or if it is determined at Step 703 that there is a display application having a possibility to use the device, information processing terminal 10 activates the new application on the same display as that of the display application (Step 706).

If it is determined at Step 704 that there is no latent application in which there is a possibility to use the device that is to be used by the new application, information processing terminal 10 activates the new application on the same display as that of the latent application (Step 707).

Moreover, in this exemplary embodiment, as illustrated in FIG. 7, the example in which the determination is made on all the fourth to sixth conditions, but the present invention is not limited to this. As another example, the determination may be made only on any one of the fourth to sixth conditions. As still another example, the determination may be made on any two of the fourth to sixth conditions.

Moreover, in this exemplary embodiment, as illustrated in FIG. 7, the example in which the fourth to sixth conditions are used in this order is shown, but the present invention is not limited to this, and the fourth to sixth conditions may be used in an arbitrary order.

Third Exemplary Embodiment

In a third exemplary embodiment, a case where there are both of a resource that can take an intermediate consumption amount as the processing capability of the CPU and a resource (device) for which presence or absence of use is fixed such as a camera will be exemplified.

A basic configuration of an information processing terminal of the third exemplary embodiment is the same as the one illustrated in FIG. 2.

Information processing terminal 10 of the third exemplary embodiment executes the screen display control by the processing in which the processing in the first exemplary embodiment, illustrated in FIG. 4, and the processing in the second exemplary embodiment, illustrated in FIG. 6, are combined.

Figure 8:
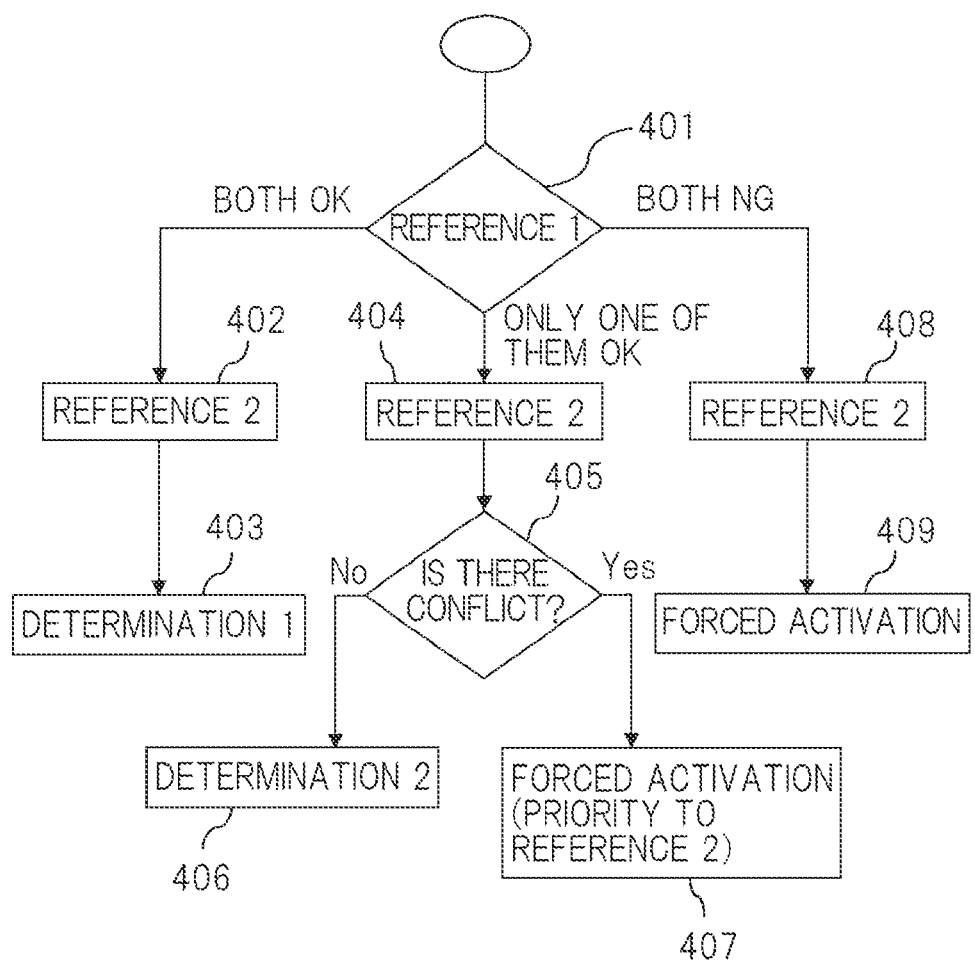
FIG. 8 is a flowchart illustrating screen display control of the application by information processing terminal 10 of a third exemplary embodiment.

FIG. 8 is a flowchart illustrating the screen display control of an application by information processing terminal 10 of the third exemplary embodiment. The processing of this screen display control is executed mainly by control unit 15. In an initial state in FIG. 8, some application may already be in execution or an application does not have to be executed at all.

By referring to FIG. 8, upon the receipt of instructions to activate a new application, information processing terminal 10 determines whether the new application can be activated on display 11, can be activated on display 12 or cannot be activated on either of them on a first reference (Step 401). The first reference is a reference for determining whether or not a new application can be activated on a display, regarding a type of resources that can take an intermediate consumption amount. Here, the first reference is processing of Steps 101 to 103 illustrated in FIG. 4 as a specific example. However, the case where the new application can be activated on both of displays 11 and 12 is assumed to be different from the case where it can be activated only on one of them.

If the new application can be activated on both of displays 11 and 12 based on the first reference, information processing terminal 10 subsequently determines whether the new application can be activated on display 11 or on display 12 based on a second reference (Step 402).

The second reference is a reference for determining whether or not a new application can be activated on a display, regarding a type of resources for which presence or absence of use is fixed. The second reference here is processing at Steps 301 to 302 illustrated in FIG. 6 as a specific example. However, the case where the new application can be activated on both of displays 11 and 12 is assumed to be different from the case where it can be activated only on one of them.

Subsequently, information processing terminal 10 determines (determination 1) the display on which the new application is to be activated on the basis of a determination result at Step 402 (Step 403). Since priority is not given to either display 11 or 12 in the first reference, determination can be made on the second reference in determination 1.

Specifically, it is only necessary that information processing terminal 10 executes processing at Steps 303 and 304 illustrated in FIG. 6.

If it is determined at Step 401 that the new application can be activated on either display 11 or 12, information processing terminal 10 subsequently determines whether the new application can be activated on display 11 or can be activated on display 12 based on the second reference (Step 404).

Subsequently, information processing terminal 10 determines whether or not there is a conflict between the determination result based on the first reference and the determination result based on the second reference (Step 405). Regarding the display on which it is determined that the new application can be activated based on the first reference, if it is determined here that the new application can also be activated based on the second reference, there is no conflict. Regarding the display on which it is determined, based on the first reference, that the new application can be activated, if it is determined that the new application cannot be activated based on the second reference and also, if the new application can be activated on the other display based on the second reference, a conflict occurs.

If there is no conflict, information processing terminal 10 determines (determination 2) the display on which the new application is to be activated on the basis of the determination results of the first and second references (Step 406). If there is a display on which it is determined that the new application can be activated based on both the first and second references, for example, it is only necessary to determine that the new application is activated on the display.

If there is a conflict, information processing terminal 10 determines the display on which the new application is activated by giving priority to the second reference over the first reference and activates the new application on that display as an example (Step 407). Specifically, information processing terminal 10 determines that the new application is to be activated on the display on which it is determined that the new application can be activated based on the second reference. When the new application is to be activated, information processing terminal 10 executes the forced activation processing illustrated in FIG. 5.

The example in which the second reference is given priority over the first reference is shown here as an example, but the present invention is not limited to this. As another example, the first reference may be given priority over the second reference or in the case of a conflict, it may be so determined that the new application is not to be activated.

If it is determined at Step 401 that the new application cannot be activated on either of the displays, information processing terminal 10 subsequently determines whether or not the new application can be activated on display 11 or can be activated on display 12 based on the second reference (Step 408).

Information processing terminal 10 determines the display on which the new application is to be activated based on the determination result of the second reference at Step 408 and activates the application by the forced activation processing (Step 409). If it is determined that the new application can be activated on either one of the displays based on the second reference, information processing terminal 10 activates the new application on that display. If it is determined that the new application can be activated on both displays 11 and 12 based on the second reference, information processing terminal 10 activates the new application on the arbitrarily selected display.

Here, the example in which the new application is activated on either one of the displays at Step 409 is shown, but the present invention is not limited to this. As another example, if the new application cannot be activated on either display 11 or 12 based on the first reference at Step 401, it may be so determined that the processing at Step 408 cannot be executed and the new application is not to be activated.

Moreover, since this is the example in which the second reference is given priority over the first reference, it is not assumed that determination is made that the new application cannot be activated on either of the displays based on the second reference. However, if the first reference is given priority over the second reference, such determination might be made that the new application cannot be activated on either of the displays based on the second reference. In that case, it is only necessary to determine on which display the new application is to be activated based on the first reference.

Moreover, in FIG. 8, the example in which determination is made based on the second reference after the determination based on the first reference is shown, but the present invention is not limited to this. As another example, the determination may be made based on the first reference after the determination based on the second reference.

Figure 9:
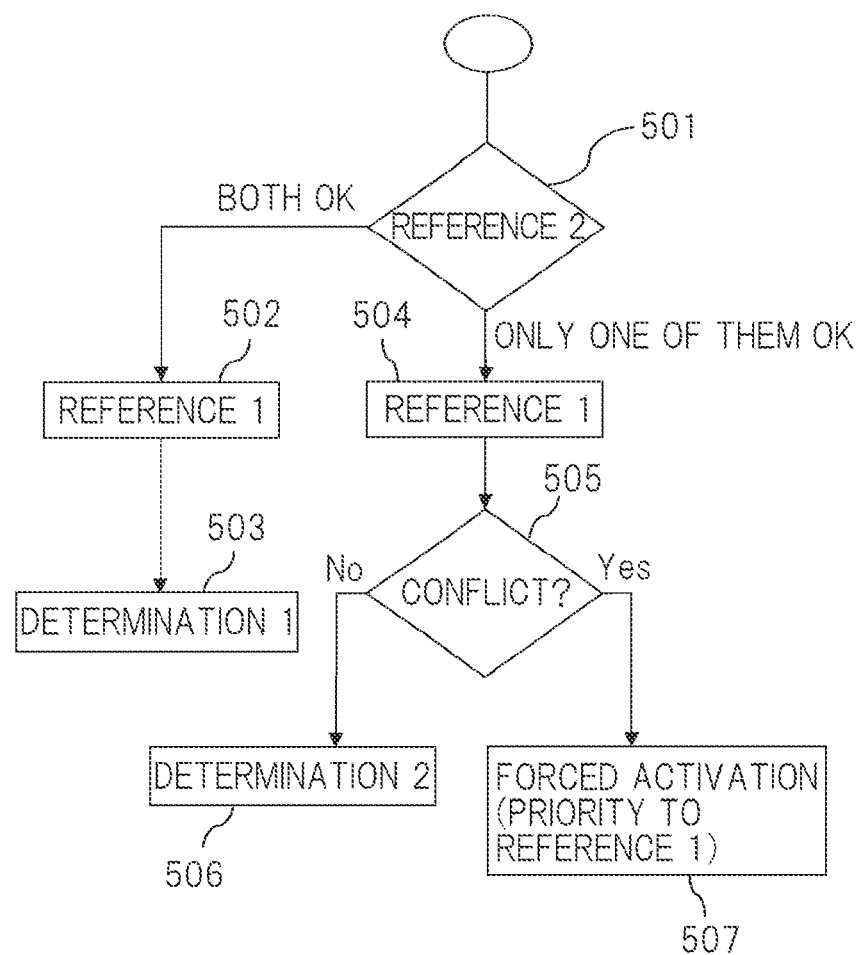
FIG. 9 is a flowchart illustrating screen display control of the application by information processing terminal 10 of a variation of the third exemplary embodiment.

FIG. 9 is a flowchart illustrating screen display control of the application by information processing terminal 10 of a variation of the third exemplary embodiment.

By referring to FIG. 9, upon the receipt of instructions to activate a new application, information processing terminal 10 determines whether the new application can be activated on display 11 or can be activated on display 12 based on the second reference (Step 501).

If the new application can be activated on both displays 11 and 12, information processing terminal 10 subsequently determines whether the new application can be activated on display 11, can be activated on display 12 or cannot be activated on either of them based on the first reference (Step 502). Then, information processing terminal 10 determines (determination 1) the display on which the new application is to be activated on the basis of the determination result at Step 502 (Step 503). Since priority is not given to either display 11 or 12 in the second reference, it is only necessary to make determination based on the first reference in determination 1. Specifically, it is only necessary that information processing terminal 10 execute processing at Steps 104 and 105 illustrated in FIG. 4.

If it is determined at Step 501 that the new application can be activated only on either display 11 or 12, information processing terminal 10 subsequently determines whether the new application can be activated on display 11, can be activated on display 12 or cannot be activated on either of them based on the first reference (Step 504).

Subsequently, information processing terminal 10 determines whether or not there is a conflict between the determination result based on the first reference and the determination result based on the second reference (Step 505). Here, regarding the display on which it is determined that the new application can be activated based on the second reference, if it is determined that the new application can be also activated based on the first reference, there is no conflict. Moreover, if it is also determined that the new application cannot be activated on either of the displays based on the first reference, there is no conflict. Regarding the display on which it is determined that the new application can be activated based on the second reference, if it is determined that the new application cannot be activated based on the first reference and that the new application can be activated on the other display based on the first reference, a conflict occurs.

If there is no conflict, information processing terminal 10 determines the display (determination 2) on which the new application is to be activated based on the determination results of the first and second references (Step 506). If it is determined that the new application cannot be activated on either of the displays based on the first reference, for example, it will only be necessary to determine the display on which it is determined that the new application can be activated based on the second reference. In that case, information processing terminal 10 executes forced activation processing illustrated in FIG. 5.

If there is a conflict, information processing terminal 10 determines the display on which the new application is to be activated by giving priority to the first reference over the second reference as an example and activates the new application on that display (Step 507). Specifically, information processing terminal 10 determines that the new application is activated on the display on which it is determined that the new application can be activated based on the first reference. When the new application is to be activated, information processing terminal 10 executes the forced activation processing illustrated in FIG. 5.

Here, the example in which the first reference is given priority over the second reference is shown as an example, but the present invention is not limited to this. As another example, the second reference may be given priority over the first reference, or if there is a conflict, it may be so determined that the new application is not to be activated.

Moreover, the examples in which the first reference is used first in a fixed manner in the third exemplary embodiment and the second reference is used first in a fixed manner in the variation of the third exemplary embodiment are shown. However, the present invention is not limited to them. Whether the first condition or the second condition is to be used first may be selected in accordance with the application which is to be newly activated. By setting which of the resource (device) for which presence or absence of use is fixed and the resource that can take an intermediate consumption amount is to be given priority in advance for each application, which of the first reference and the second reference is to be used first may be selected in accordance with the setting. For example, if an application with setting that the device is given priority is to be activated, it may be so configured that determination is made first based on the first condition and then, determination is made based on the second condition. Or the order may be reversed. Moreover, which resource is to be given priority may be fixed in advance for each application. In that case, it is only necessary that a reference relating to the type to which the resource with priority belongs is used first or later.

Fourth Exemplary Embodiment

In the first to third exemplary embodiments, the case where two displays 11 and 12 have the same device characteristics is assumed, but display 11 and display 12 may have different characteristics. The display characteristics include a frame rate of the display, whether or not a camera or a sensor is provided in the housing on which the display is mounted and the like.

If displays 11 and 12 have different characteristics, information processing terminal 10 preferably gives priority to the display having the characteristics suitable for the application over the other display. That is, information processing terminal 10 preferably maintains the entire amount of resources that are consumed properly as described above, prevents the applications from competing with each other in the device used by them and selects the display having the characteristics suitable for the new application with priority.

In the first to third exemplary embodiments, information processing terminal 10 activated the new application on the display selected on the basis of the determination based on the amount of resources that are consumed, the determination based on the presence or absence of use of the resource (device) or a determination result of the determination combining them. In a fourth exemplary embodiment, information processing terminal 10 determines on which of displays 11 and 12 a new application is to be displayed by adding another condition on how displays 11 and 12 satisfy the characteristics required by the application.

Figure 10:
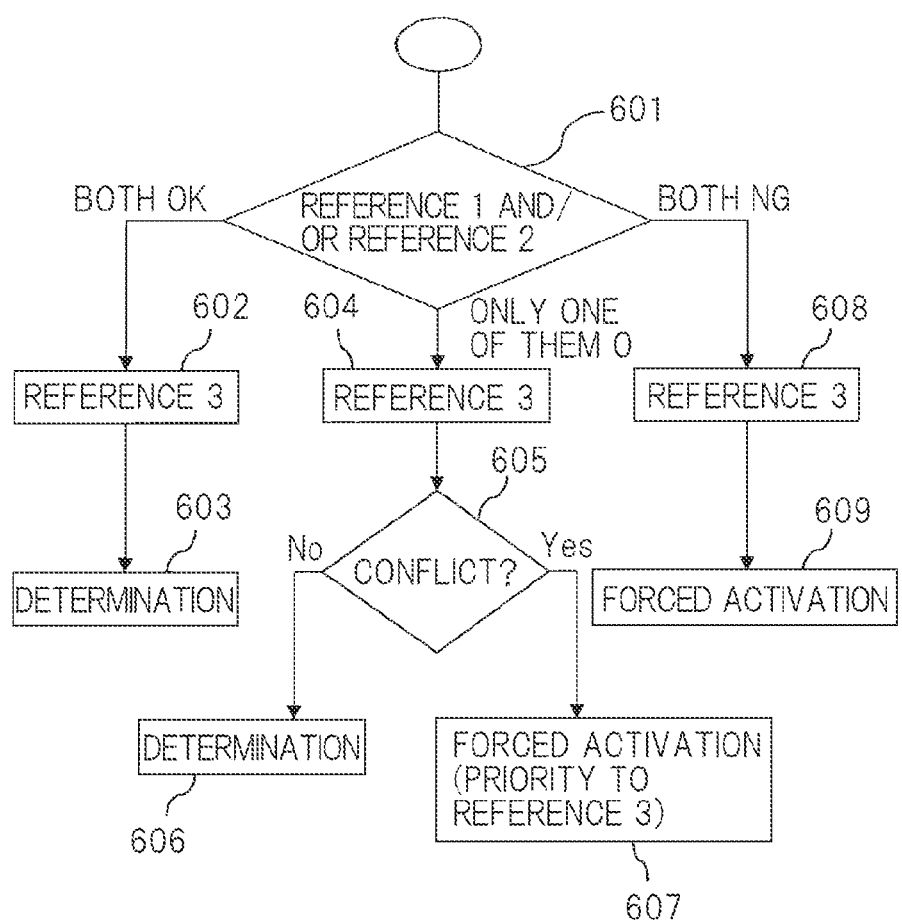
FIG. 10 is a flowchart illustrating screen display control of the application by information processing terminal 10 of a fourth exemplary embodiment.

FIG. 10 is a flowchart illustrating screen display control of the application by information processing terminal 10 of the fourth exemplary embodiment.

By referring to FIG. 10, upon the receipt of instructions to activate a new application, information processing terminal 10 determines whether the new application can be activated on display 11, can be activated on display 12 or cannot be activated on either of them based on the above-described first reference or second reference or a combination of them (Step 601). The determination may be made similarly to those illustrated in the first to third exemplary embodiments.

At Step 601, if the new application can be activated on both of displays 11 and 12, information processing terminal 10 determines whether the new application can be activated on display 11 or can be activated on display 12 based on the following third reference (Step 602).

The third reference is a reference for determining whether or not the characteristics of displays 11 and 12 satisfy the requirement of the new application. If the new application requires display on a display mounted on the same housing as the camera, for example, the display mounted on the same housing as the camera satisfies the requirement of the new application, while the display mounted on a housing different from the camera does not satisfy the requirement of the new application.

Subsequently, information processing terminal 10 determines a display on which the new application is to be activated on the basis of the determination result at Step 602 (Step 603). Since priority is not given to either of displays 11 and 12 at Step 601, determination can be made on the third reference here. Specifically, if either one of displays 11 and 12 satisfies the requirement of the application, information processing terminal 10 selects the display. Alternatively, if both displays 11 and 12 satisfy the requirement of the application, information processing terminal 10 arbitrarily selects either one of the displays.

If it is determined at Step 601 that the new application can be activated on either display 11 or 12, information processing terminal 10 subsequently determines whether the new application can be activated on display 11 or can be activated on display 12 based on the third reference (Step 604).

Subsequently, information processing terminal 10 determines whether or not there is a conflict between the determination result at Step 601 and the determination result at Step 604 based on the third reference (Step 605). Here, regarding the display on which it is determined at Step 601 that the new application can be activated, if it is determined that the new application can be activated also based on the third reference, there is no conflict. Regarding the display on which it is determined at Step 601 that the new application can be activated, if it is determined that the new application cannot be activated based on the third reference and also if it is determined that the new application can be activated on the other display based on the third reference, there is a conflict.

If there is no conflict, information processing terminal 10 determines the display on which the new application is to be activated on the basis of the determination result at Steps 601 and 604 (Step 606). It is only necessary to determine that the new application is activated on the display on which it is determined that the new application can be activated at both of Steps 601 and 604.

If there is a conflict, information processing terminal 10 determines the display on which the new application is to be activated by giving priority to the determination based on the third reference over the determination at Step 601 as an example and activates the new application on that display (Step 607). Specifically, information processing terminal 10 determines to activate the new application on the display on which it is determined that the new application can be activated based on the third reference. When the new application is to be activated, information processing terminal 10 executes the forced activation processing illustrated in FIG. 5.

Here, the example in which the determination based on the third reference is given priority over the determination at Step 601 is shown as an example, but the present invention is not limited to this. As another example, the determination at Step 601 may be given priority over the determination based on the third reference or it may be so determined that the new application is not activated if there is a conflict.

If it is determined at the determination at Step 601 that the new application cannot be activated on either of the displays, information processing terminal 10 subsequently determines whether the new application can be activated on display 11 or can be activated on display 12 based on the third reference (Step 608).

Information processing terminal 10 determines the display on which the new application is to be activated on the basis of the determination result based on the third reference at Step 608 and activates the new application through the forced activation processing (Step 609). For example, if it is determined that the new application can be activated on one of the displays based on the third reference, information processing terminal 10 activates the new application on that display. If it is determined that the new application can be activated on both of displays 11 and 12 based on the third reference, information processing terminal 10 activates the new application on the arbitrarily selected display.

Here, the example in which the new application is activated on either of the displays at Step 609 is shown, but the present invention is not limited to this. As another example, if the new application cannot be activated on either of displays 11 and 12 in the determination at Step 601, it may be so determined that the new application is not to be activated without executing the processing at Step 608.

Moreover, in FIG. 10, the example in which determination is made on the basis of the third reference after the determination at Step 601 is shown, but the present invention is not limited to this. As another example, the determination at Step 601 may be made after determination is made based on the third reference.

Moreover, it may be so configured that priority indicating to what degree the characteristics of the display are given priority is set for each application and selection is made based on the priority if there is a conflict at Step 605. For example, in the case of a conflict at Step 605, if the priority of the characteristics of the display is not less than a threshold value, it is only necessary to activate the application on the display on which it is determined that the application can be activated based on the third reference. Moreover, if the priority of the characteristics of the display is smaller than the threshold value, it is only necessary to activate the application on the display on which it is determined that the application can be activated at Step 605.

For example, if the application is to display high-quality moving images, the characteristics in which the high-quality image can be displayed may take priority in that application.

Moreover, in the case of an application necessarily using the camera, a device characteristic that a camera is provided may be an indispensable priority (highest priority) and in the case of an application using the camera as appropriate, a characteristic in which a camera is provided may be given a certain priority (a medium degree of priority). Moreover, the priority may be changed in accordance with a use frequency of the actual camera in the past execution. For example, in the case of the application using a camera, the characteristic in which the camera is provided may be set to a predetermined priority as an initial value and if the use frequency of the camera turns out to be high after that, the priority may be raised, while the use frequency of the camera is low, the priority may be lowered.

Moreover, in the case of an application using a sensor such as an acceleration sensor, a characteristic in which a sensor is provided may be set to an indispensable or a certain priority. In the case of an application using opening/closing of housings 13 and 14 in information processing terminal 10 having a shape illustrated in FIG. 1 for some control and not requiring high accuracy for detection of acceleration, the characteristic that the sensor is provided may be set to a certain priority corresponding to that requirement. In the case of an application displaying a current location or a direction by using a 3D (three dimensions) map and requiring high accuracy for detection of acceleration, the characteristic that the sensor is provided may be set to an indispensable priority. Alternatively, even in the case of an application displaying the current location or direction by using the 3D map, if a user allowed to display on the display on which the sensor is not provided in the past execution, the priority of the characteristic that the sensor is provided may be somewhat lowered from the priority of the indispensable.

Fifth Exemplary Embodiment

In the first to fourth exemplary embodiments, the case in which there is no special association among the applications is assumed, but a plurality of applications may have mutual association in some cases. If a user frequently uses another specific application while using a certain application, for example, the applications may be associated with each other as a related application set. The fifth exemplary embodiment is an example assuming the case in which the plurality of applications are associated with each other.

A basic configuration of an information processing terminal of the fifth exemplary embodiment is the same as the one illustrated in FIG. 2. In this exemplary embodiment, information processing terminal 10 executes processing in which, when one of applications in a related application set is newly activated, if the other application that is being executed as a latent application, it is changed to a display application, while if the other application is not being executed, they are activated at the same time in addition to the processing illustrated in the third exemplary embodiment. However, at that time, it is executed on condition that the total sum of amount of resources that are consumed does not exceed a threshold value and no competition is caused in use of the devices. If another application is not associated with the application to be newly activated, information processing terminal 10 executes processing similar to that of the third exemplary embodiment.

As an example, it is assumed that application A1 and application A2 are associated with each other as a related application set. Information processing terminal 10 maintains association information of the related application set in advance. When activation of application A1 is requested, information processing terminal 10 refers to the association information and recognizes application A2 associated with application A1. Then, information processing terminal 10 displays applications A1 and A2 on displays 11 and 12 on condition that the entire amount of resources that are consumed does not exceed the threshold value and also competition does not occur in resource use.

Information processing terminal 10 determines whether or not a condition that the entire amount of resources that are consumed does not exceed the threshold value and competition does not occur in resource use is met by the method similar to the method used in the third exemplary embodiment. However, the related application set should be a combination which does not cause a problem in the entire amount of resources that are consumed and competition in device use. Therefore, in the first to third conditions, the condition that the entire amount of resources that are consumed does not exceed the threshold value is usually satisfied all the time in the first and second conditions excluding the third condition considering the latent application.

Information processing terminal 10 may arbitrarily display either application A1 or A2 on either display but it may be determined as follows, for example.

If application A2 associated with application A1, for which activation is requested, is already a display application on display 11 or on display 12, information processing terminal 10 activates application A1 on the other display.

If application A2 is a latent application of either one of the displays, information processing terminal 10 elevates application A2 to the display application of the display and activates application A1 on the other display. If application A2 is not being executed, information processing terminal 10 activates application A2 together with application A1. At that time, which application is to be activated on which display is determined arbitrarily.

For example, assume that a moving image reproduction application is associated with a browser, the browser is displayed on display 12, and a calculator application is displayed on display 11. If execution of the moving image reproduction application is requested from that state, it is only necessary that information processing terminal 10 activate the moving image reproduction application on display 11 on condition that the total sum of the amount of resources that are consumed does not exceed the threshold value. As a result, the moving image reproduction application and the browser associated with each other can be used by a user at the same time.

Moreover, if a plurality of applications associated with each other as a related application set are to be newly activated, information processing terminal 10 may assume which application is to be finished first and determine the display on which each application screen is to be displayed.

Specifically, information processing terminal 10 sets an application assumed to be finished first in the related application set as a sub application and an application assumed to be finished later as a main application in the association information in advance. Then, information processing terminal 10 determines the display on which each application screen is to be displayed so that the total sum of the amount of resources that are consumed does not exceed the threshold value if the sub application is finished. Specifically, it is only necessary to activate the sub application on either display 11 or 12 with the application that consumes a smaller amount of resources on the surface and to activate the main application on either one of displays 11 and 12 with the application that consumes a larger amount of resources on the surface.

Sixth Exemplary Embodiment

In the first exemplary embodiment, on which display to activate a new application is determined after determination is made for all the first the third conditions unless it is determined that the new application cannot be activated on either of displays 11 and 12. However, the present invention is not limited to this. As a sixth exemplary embodiment, a case in which, if it is determined that a new application can be activated on only one of the displays based on any one of the conditions while determination is made sequentially on the first to third conditions, it is determined that the new application is to be activated on that display will be exemplified. In this case, if it is determined that the new application can be activated only on one of the displays, the determination on the subsequent conditions does not have to be made, and determination processing can be reduced.

A basic configuration of information processing terminal 10 of the sixth exemplary embodiment is a configuration illustrated in FIG. 2.

Figure 11:
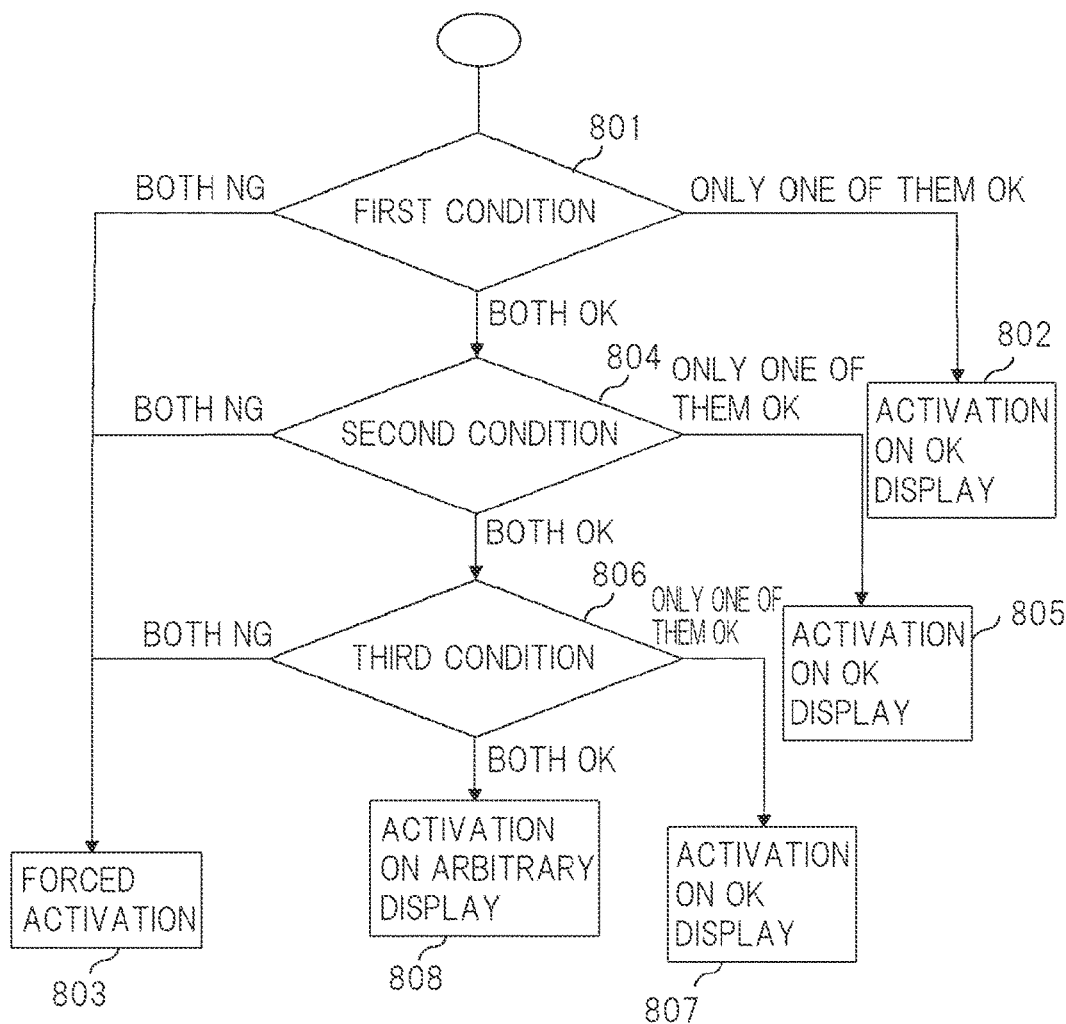
FIG. 11 is a flowchart illustrating screen display control of the application by information processing terminal 10 of a sixth exemplary embodiment.

FIG. 11 is a flowchart illustrating screen display control of the application by information processing terminal 10 in the sixth exemplary embodiment. The processing of this screen display control is executed mainly by control unit 15. In an initial state in FIG. 11, some application may be already in execution or an application does not have to be executed at all.

By referring to FIG. 11, upon the receipt of instructions to activate a new application, information processing terminal 10 first determines whether the new application can be activated on display 11, can be activated on display 12 or cannot be activated on either of the displays based on a first condition (Step 801). The first condition is the same as that in the first exemplary embodiment and is a condition that, if the new application is activated on one of the displays, the total sum of the statistic amount of resources that were consumed by the application in the past and the current amount of resources that are consumed by an application that is being executed on the surface of the other display, does not exceed a predetermined threshold value. The statistic amount of the resources that are consumed is an average value of the amount of resources that were consumed in the past as an example. If the application is not to be activated due to the amount of resources that are consumed by the application that is being executed in real-time, it is determined that activation is not possible in this first condition.

If the application can be activated on either display 11 or 12, information processing terminal 10 activates the new application on that display (Step 802). For example, if the new application is activated on display 11, the application having appeared on the surface of display 11 hides below the new application. The amount of resources that are consumed by the application that is being executed in real-time is concealed below decreases.

If the application cannot be activated on either display 11 or 12, information processing terminal 10 executes the forced activation processing (Step 803). Here, the forced activation processing is the same as that in the first exemplary embodiment illustrated in FIG. 5 and is processing to activate the requested new application while controlling the state of the application that is being executed so that the total of the amount if resources that are consumed is reduced.

If the application can be activated on both displays 11 and 12 on the first condition, information processing terminal 10 subsequently determines whether an application can be newly activated on display 11, can be activated on display 12 or cannot be activated on either of them based on a second condition (Step 804). Here, the second condition is the same as that of the first exemplary embodiment and is a condition that, if a new application is to be activated on either display 11 or 12 satisfying the first condition, the total sum of the amount of resources that were consumed which is a past statistic amount of the new application and the amount of resources that were consumed of a past statistic amount of the application that is being executed on the surface of another display, does not exceed a threshold value. The statistic amount of resources that are consumed is an average value of the amount of resources that are consumed in the past as an example again. Assuming that the application that being executed is changing according to the average amount of resources that are consumed, if the application is not to be activated, it is determined that activation is not possible on this second condition.

On the second condition, if the application can be activated on either display 11 or 12, information processing terminal 10 activates the new application on that display (Step 805).

If the application cannot be activated on either display 11 or 12 based on the second condition, information processing terminal 10 arbitrarily selects either one of the displays and forcedly activates the new application on that display (Step 803).

If the application can be activated on both displays 11 and 12 also based on the second condition, information processing terminal 10 subsequently determines whether an application can be newly activated on display 11, can be activated on display 12 or cannot be activated on either of them on a third condition (Step 806). Here, the third condition is the same as that of the first exemplary embodiment and is a condition that, if the application on the surface of the display among the plurality of applications executed with the application screens superimposed on the display is finished, the total of the amount of resources that are consumed by the applications on the surfaces of two displays 11 and 12 do not exceed a threshold value. If it is assumed that a problem will occur in the entire amount of resources that are consumed when the applications on the surfaces of displays 11 and 12 are finished and the applications below them come to the surface, it is determined that activation is not possible on this third condition.

If the application can be activated on either display 11 or 12 on the third condition, information processing terminal 10 activates the new application on that display (Step 807).

If the application cannot be activated on either display 11 or 12 on the third condition, information processing terminal 10 arbitrarily selects either display 11 or 12 and forcedly activates the new application on that display (Step 803).

If the application can be activated on both displays 11 and 12 also on the third condition, information processing terminal 10 arbitrarily selects either display 11 or 12 which satisfied all the first to third conditions and activates the new application on that display (Step 808). However, this is an example, and as another example, determination may be made based on a further condition. Specifically, if there is a difference in the amount of resources that are consumed between the activation of the new application on display 11 and the activation of the new application on display 12, the display that consumes a smaller amount of resources may be selected.

Moreover, in this exemplary embodiment, as illustrated in FIG. 11, the example in which determination based on all the first to third conditions are used is shown, but the present invention is not limited to this. The determination may be made based only on any one of the first to third conditions as another example. As still another example, the determination may be made based on any two of the first to third conditions.

Moreover, in this exemplary embodiment, as illustrated in FIG. 11, the example in which the first to third conditions are used in this order is shown, but the present invention is not limited to this, and the first to third conditions may be used in an arbitrary order.

Seventh Exemplary Embodiment

In the fourth exemplary embodiment, the example in which the condition (third reference) of how well the characteristic requested by the application is satisfied by displays 11 and 12 is additionally used in combination with other conditions (first and second references) relating to resource consumption or is used when a new application is activated on each of the displays is shown. However, the present invention is not limited to this. The condition of how well the characteristics required by the application are satisfied by displays 11 and 12 can be used as a main condition, and this will be exemplified in this exemplary embodiment. In this exemplary embodiment, the condition relating to consumption or use of the resource is not used for determining on which display the new application is to be activated but is assumed to be additionally used when a new application is activated by calculating as the entire apparatus.

Information processing terminal 10 of this exemplary embodiment has the plurality of displays 11 and 12 displaying the respective application screens and control unit 15 which determines the display on which a new application is to be activated from the plurality of displays 11 and 12. If an application that is being executed competes with a first condition (first non-dependent condition) not depending on the display requested by the new application, control unit 15 finishes the application that is being executed and determines the display on which the new application is to be activated by using the first condition (first depending condition) depending on the display requested by the new application or a second condition (second non-dependent condition) not depending on the display requested by the new application. Therefore, information processing terminal 10 of this exemplary embodiment can determine the display on which the new application is to be activated by considering a plurality of conditions at the same time. Detailed explanation will be described below.

The above-described dependent condition and non-dependent condition are stipulated in this exemplary embodiment as a condition (indispensable condition) indispensable for the application and a condition (non-indispensable condition) which is not indispensable but preferably satisfied and they are used for determination when a new application is to be activated. Here, the indispensable condition means a condition with a degree of request higher than the other conditions among the conditions requested by the application. On the other hand, the non-indispensable condition means a condition with a degree of request lower than the indispensable condition. The degree requested by the application can be set in advance for each application or can be set by an operation of a user. Moreover, the degree requested by the application can be set in accordance with the type of resources relating to the respective conditions or can be set in accordance with a frequency of execution of the application by the user in a state where the condition is satisfied.

Moreover, the indispensable condition does not mean only a condition in which the application does not operate at all if the condition is not satisfied in the case of the condition with a request degree higher than the other conditions. Therefore, the indispensable conditions may include not only a condition in which the application does not operate at all if the condition is not satisfied but also a condition in which the operation of the application becomes incomplete or performance would be lowered if the condition is not satisfied.

Examples relating to performance of a display that can be an indispensable condition or a non-indispensable condition include one relating to hardware to obtain a frame rate with a certain level or higher required for moving image reproduction. Moreover, examples relating to a function of the display that can be an indispensable condition or a non-indispensable condition include a touch-panel function and an input function by a touch-pen. Furthermore, examples relating to a configuration around the display that can be an indispensable condition or a non-indispensable condition include that the display has a predetermined positional relationship (being mounted on the same housing, for example) with an acceleration sensor, a geomagnetic sensor, a contact sensor, a camera and the like.

For example, for an application for reproducing moving images, provision of hardware required for a display to reproduce moving images can be set as an indispensable condition. If only either displays 11 or 12 is provided with hardware required for reproduction of moving images, the indispensable condition depends on the display.

Moreover, for an application using a touch operation, a condition that the display is a touch-panel type as an indispensable condition can be set. If only either display 11 or 12 is a touch-panel type, the indispensable condition depends on the display. The indispensable condition in this exemplary embodiment is set regardless of dependence on the display and there is an indispensable condition not depending on the display other than the indispensable condition depending on the display.

As an example of the indispensable condition not depending on the display, availability of the resources owned by information processing terminal 10 can be cited. Examples of the resource include an acceleration sensor, a camera, a file system, a communication function, a microphone, a sound output function, a recording function and the like. Examples of the communication function include a sound call, a wireless or wired data communication, Bluetooth, infrared communication and the like. However, the present invention is not limited to these examples.

Moreover, for an application reproducing high-quality moving images, a predetermined performance relating to moving images can be an indispensable condition or a non-indispensable condition. For example, high-quality moving image reproduction, preview of an image taken by a camera, application processing of a game and the like can be considered. Moreover, their respective indispensable conditions or non-indispensable conditions might depend on the display and can be satisfied only by either one of the displays.

In the application for moving images or the preview of images taken by a camera, a certain level or higher of the frame rate might be set as an indispensable condition. For example, the frame rate is fixed to 30 FPS (Frames Per Second) for a moving-image file, and it is preferable that reproducibility of the frame rate higher than that be set as an indispensable.

Moreover, since images in the moving image file are compressed in general, decoding processing thereof takes time. If the hardware does not have sufficient capability of decoding processing, for example, the reproduced moving images move very awkwardly.

Specifically, hardware exclusive for moving-image reproduction such as DSP (Digital Signal Processor) for decoding processing, hardware exclusively for displaying a preview of an image taken by a camera and the like are used. And a configuration in which this kind of hardware can be used only on either one of the displays might be employed. In that case, a condition that the display can use such hardware is an indispensable condition and that is a condition dependent on the display. Moreover, desired decoding processing might be realized only by software of an application without using exclusive hardware. In that case, the frame rate is a condition that does not depend on the display.

Moreover, even for an application for reproducing high-quality moving images, the frame rate of the display is preferably not less than a predetermined value, but there can be a case in which, even though the frame rate is lower than the predetermined value, moving images can be reproduced though its image quality is low. For such applications, a condition that the frame rate of the display is not less than a predetermined value can be set as a non-indispensable condition.

Moreover, a GPU (Graphics Processing Unit) might be provided for application processing of a game or openGL (Open Graphics Library) might be employed. Since the GPU is provided corresponding to a display in general, it can be used only on either one of the displays in some cases. The openGL is generally implemented in a manner that does not depend the display, but there can be implementation such that the openGL can be used only on either one of the displays. In that case, it is only necessary that a condition that display can use the GPU or the openGL depending on implementation of the device is set as an indispensable condition or as a non-indispensable condition.

Moreover, depending on the game, an application can be designed such that the application measures a frame rate that can be handled by the device and an image is outputted at the frame rate according to that. In that case, it is preferable but not indispensable for the display to be able to reproduce the maximum frame rate that the application of the game can output, and it can be set as a non-indispensable condition.

Moreover, the speed of a bus for transferring image data generated by a processor of the device main body to the display might affect the frame rate. For example, if the time required to transfer one image from the processor of the device main body to the display is 10 msec, the frame rate is limited to 100 FPS at the maximum. If the time required to transfer one image from the processor of the device main body to the display is 5 msec, the frame rate is 200 FPS at the maximum. In this case, a condition that the speed of the bus for transferring the image data generated by the processor of the device main body to the display is not less than the predetermined value can be set as an indispensable condition or as a non-indispensable condition.

If there are a plurality of non-indispensable conditions, the degrees (priority) of how much is required by an application may be different in them. Moreover, even in the same non-indispensable condition, a degree (priority) of how much is required by an application may be different. This priority can be set in advance for each application or can be set by an operation of the user. Moreover, this priority can be set in accordance with the type of resources relating to each condition or can be set in accordance with a frequency of execution of the application by the user while the condition is satisfied.

In this specific example, an achievement degree (a request achievement degree) of a request of an application is specified by considering the degrees and is used to determine on which display a new application is to be activated. Specifically, a display with a higher request achievement degree is given priority.

For example, it is only necessary to calculate a point representing the request achievement degree of each display and to give priority to the display with a characteristic having a higher point. A request condition of an application using a device in accordance with the request by a user may include a use request degree indicating how much the device is requested. Control unit 15 statistically calculates the use request degree of the device in the application on the basis of presence or absence of use of the device when the application was executed in the past. For example, assuming that the achievement value is set to 1 when the device is used, and the achievement value is set to 0 when the device is not used, the average value of the achievement values in the past execution is calculated and the result may be used as the use request degree.

Moreover, the request condition of the application using the device may include a device arrangement request degree indicating how much is requested to activate the application on the display having the characteristic of being mounted on the same housing as the device. Control unit 15 statistically calculates the device arrangement request degree in the application on the basis of a degree of the execution in display 12 mounted on the same housing as the device when the application was executed in the past in comparison with display 11.

When the above-described point of each display is to be calculated, calculation can be made, for example, by adding a value obtained by multiplying the use request degree of the device by the application and the device arrangement request degree to display 12 mounted on the same housing as the device.

Such indispensable conditions and non-indispensable conditions are used when determining on which display to activate a new application in this specific example in the same way as the determination of the third reference used in the fourth exemplary embodiment.

Here, a racing game is assumed as an example of the application, and an example of setting and calculation of the indispensable condition and the non-indispensable condition will be illustrated. However, the configuration of the device and setting of the conditions illustrated here are exemplification, and the present invention is not limited by them.

This racing game is a game in which a racing car is made to run on a course by an operation, and it is assumed that rapid movement of a background and the like is reproduced by high-quality moving images. A mode operated through a touch panel and a mode operated by an acceleration sensor are assumed. Moreover, a plurality of users can compete with each other through communication using Bluetooth among information processing terminals 10.

Moreover, the acceleration sensor is mounted on only either one of the housings in the information processing terminal, but it is assumed that the acceleration sensor can operate a display on both displays. However, it is assumed that the operation of the display mounted on the same housing as the acceleration sensor has accuracy higher than that of the operation of the other display. It is assumed that the Bluetooth is not dependent on the display, but if it is in use by an application it cannot be used by another application.

In the above assumption, if only one of the two displays owned by the information processing terminal can handle hardware exclusive for image, capability to reproduce images at a certain frame rate and higher, that is, compliance with hardware exclusive for image can be set as an indispensable condition. The hardware exclusive for image reproduction includes the GPU, an OpenGL accelerator and the like.

Moreover, if both two displays can reproduce a high-quality image, that is, an image with a high frame rate that can be used for the racing game, but if one of the displays can reproduce images with a quality higher than that of the other display, a condition that a display is capable of reproducing an image with a higher frame rate can be set as a non-indispensable condition.

Moreover, the condition that the display is mounted on the same housing as the acceleration sensor can be set as a non-indispensable condition. The reason is because, if the racing game is executed on the other display, the accuracy of the operation is lowered in the mode operated by the acceleration sensor.

Moreover, a non-indispensable condition relating to the Bluetooth can be set though it is not a condition fixedly corresponding to the display. Since Bluetooth is required when using a fighting game, the racing game is preferably activated in a state where Bluetooth can be used. It is only necessary to set that an application using Bluetooth or having a possibility of using it, though it is not now is being executed on the display, as a non-indispensable condition. If an application using Bluetooth or having a possibility of using it though it is not now is executed, the racing game is activated on the display on which the application is being executed.

Since there are a plurality of non-indispensable conditions, they may be given priority ranks. A point indicating priority may be calculated for each non-indispensable condition, and a higher priority rank may be given to the condition with a higher point. As a calculation method of the point, a sum or a product of the weight given to each resource (device) such as the hardware exclusive for image, acceleration sensor, Bluetooth and the like and the use frequency of the resource can be used as the point. The weight of each resource may be a fixed value set in advance. The use frequency can be obtained by dividing the number of usage of the resource when the application is executed, by the number of times of execution of the application, for example.

For example, if the mode operated by a user through the acceleration sensor is often used, the use frequency of the acceleration sensor becomes high and as a result, the priority of the non-indispensable condition that the display is mounted on the same housing as the acceleration sensor becomes high. On the other hand, if a user often plays the racing game alone, the use frequency of the Bluetooth becomes low and as a result, the priority of the non-indispensable condition that the display is the same as the one on which the application using the Bluetooth or having a possibility of using it is executed becomes low.

Moreover, when a display to activate the racing game is to be selected, the selection may be made on the basis of the priority of the plurality of non-indispensable conditions calculated as above. As an example of the selection method, it may be determined whether or not each display satisfies each non-indispensable condition, and the display with a high total value of the points of priority of the satisfied non-indispensable conditions may be selected. Alternatively, as another example of the selection method, a display satisfying a non-indispensable condition with the highest priority in the plurality of non-indispensable conditions may be selected.

Moreover, the following policy is assumed to be applied to this specific example.

It is set as a policy that, if an application to be newly activated competes with an application that is being executed, the new application is given priority over the application that is being executed. For example, even if there is an application that is being executed on the display on which the new application is to be activated, the new application will be activated on the display and becomes a display application. As a result, the application that is being executed and that has been the display application might become a latent application or might be moved to another display or might be finished.

Moreover, it is set as a policy that, if a problem occurs due to resource consumption of the like in the entire system, the new application is given priority over the application that is being executed. As a result, the application that is being executed may be finished with activation of the new application.

Figure 12:
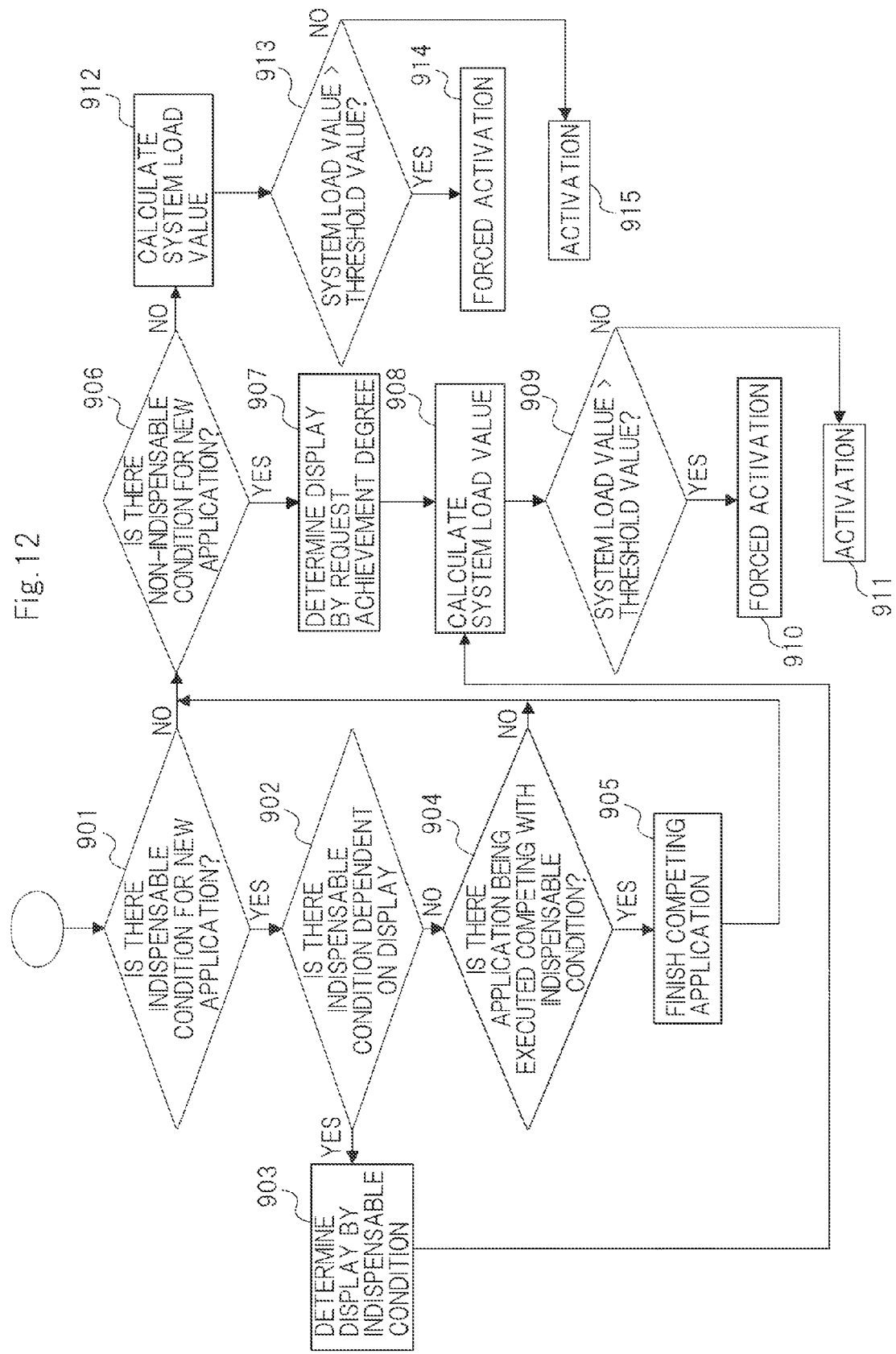
FIG. 12 is a flowchart illustrating application control by information processing terminal 10 of a seventh exemplary embodiment.

A basic configuration of the information processing terminal according to this exemplary embodiment is the same as that illustrated in FIG. 2. FIG. 12 is a flowchart illustrating application control by information processing terminal 10 in a seventh exemplary embodiment.

By referring to FIG. 12, if activation of a new application is requested, information processing terminal 10 determines whether or not there is an indispensable condition for the application (Step 901). If there is an indispensable condition, information processing terminal 10 subsequently determines whether or not there is a condition depending on the display in the indispensable conditions (Step 902).

If there is an indispensable condition depending on the display, information processing terminal 10 determines that the new application will be activated on the display satisfying the condition (Step 903).

On the other hand, if there is no indispensable condition depending on the display in the determination at Step 902, information processing terminal 10 determines whether or not there is an application having a condition competing with the indispensable condition not depending on the display of the new application in the application that are being executed (Step 904).

For example, if there is an application that is being executed and that currently using a resource not depending on the display requested by the new application as an indispensable condition, the application may be determined to compete with the indispensable condition of the new application and may be finished. Moreover, if there is an application that is being executed and that requesting a resource not depending on the display as an indispensable condition requested by the new application as an indispensable condition, the application may be determined to compete with the indispensable condition of the new application and may be finished. Furthermore, if there is an application that is being executed and that requesting a resource not depending on the display as a non-indispensable condition requested by the new application as an indispensable condition, too, the application may be determined to compete with the indispensable condition of the new application and may be finished.

Moreover, if there is an application that is being executed and that having a possibility of using a resource not depending on the display requested by the new application as an indispensable condition, the application may be determined to compete with the indispensable condition of the new application and may be finished. For example, the possibility of an application of using the device (resource) is quantified by the method similar to that in the second exemplary embodiment and if the numerical value (usage rate) exceeds a predetermined threshold value, it may be determined that the application has a possibility of using the device.

Moreover, if an application using, requesting or having a possibility of using the resource not depending on the display requested by the new application as an indispensable condition is a display application, it may be determined that the application competes with the indispensable condition of the new application.

If there is an application that is being executed and that having a condition competing with the indispensable condition of the new application, information processing terminal 10 finishes the application that is being executed (Step 905).

If there is no indispensable condition in the determination at Step 901, if there is no application that is being executed and that having a condition competing with the indispensable condition of the new application in the determination at Step 904 or if the processing at Step 905 is finished, information processing terminal 10 determines whether or not the new application has a non-indispensable condition (Step 906).

If the new application has a non-indispensable condition, information processing terminal 10 calculates the request achievement degree if the new application is activated on each of displays 11 and 12 and determines that the new application is to be activated on a display with a higher request achievement degree (Step 907).

At that time, if there are a plurality of non-indispensable conditions requested by the application, information processing terminal 10 determines that the new application is to be activated on a display with a higher degree of comprehensively satisfying them. The request achievement degree may be calculated for each non-indispensable condition, and a display having a large total value, average value or weighed added value thereof may be selected. Alternatively, information processing terminal 10 may select a display having a larger number of non-indispensable conditions satisfying the request. Moreover, information processing terminal 10 may select a display which satisfies a non-indispensable condition with the highest priority.

Subsequently, information processing terminal 10 calculates a load (system load value) such as a amount of resources that are consumed as the entire device when the new application is activated on the determined display (Step 908). Moreover, information processing terminal 10 determines whether or not the system load value is larger than a threshold value (Step 909).

The system load value is a value indicating the degree of a load as the entire device and is calculated from the amount that is consumed or usage rate of the resource provided in information processing terminal 10. Examples of the resources include resources that can take an intermediate consumption amount such as the processing capability of the CPU, a memory capacity, a communication throughput, the number of channels or electric power and a type of resource (devices) for which presence or absence of use is fixed such as a camera and a sensor.

For the resource that can take an intermediate consumption amount, its amount that is consumed may be set to a resource load value. If there are a plurality of resources, an average value of the amount of resources that are consumed may be set to a system load value, or a value that is obtained by weighted addition of the amount of each resource that is consumed may be set to a system load value.

Moreover, the threshold value that is used here is a threshold value for reducing a system load value to such a degree that a desired operation state as information processing terminal 10 can be maintained. Specifically, the threshold value is set to such a degree that lowering of an operating speed of the application, malfunction of the application or forced end of the application does not occur.

If the system load value is larger than the threshold value, information processing terminal 10 activates the new application on the display determined at Step 903 or Step 907 by the forced activation processing (Step 910). The forced activation processing here means to processing of activating the new application while the state of the application that is being executed is controlled so that the system load value is reduced. As a method for reducing the system load value, movement of the application that is being executed between the displays as illustrated in FIG. 5, inactivation or end of the display application and the like can be cited, for example.

If the system load value is no more than the threshold value, information processing terminal 10 activates the new application on the display determined at Step 903 or Step 907 (Step 911).

If the new application does not have a non-indispensable condition in the determination at Step 906, information processing terminal 10 calculates a system load value for each of displays 11 and 12 when the new application is activated on the display (Step 912). Moreover, information processing terminal 10 compares the system load value of each of displays 11 and 12 with a threshold value (Step 913). As an example, the threshold value used at Step 913 is the same threshold value as that used at Step 909. However, the threshold value used at Step 913 and the threshold value used at Step 909 may be different from each other.

If there is a display whose system load value does not exceed the threshold value, information processing terminal 10 activates the new application on that display (Step 914). For example, if the system load value of either display 11 or 12 is not more than the threshold value, it is only necessary that information processing terminal 10 activate the new application on that display. Alternatively, if the system load values of both displays 11 and 12 are not more than the threshold value, it is only necessary that information processing terminal 10 arbitrarily select one of the displays and activate the new application on that display.

On the other hand, if there is no display whose system load value does not exceed the threshold value, information processing terminal 10 arbitrarily selects either one of the displays and activates the new application on that display by the forced activation processing (Step 915).

The indispensable conditions and the non-indispensable conditions enumerated in this specific example are examples for facilitating understanding. Other conditions such as the display being mounted on the same housing as the camera, the display being mounted on the same housing as the acceleration sensor and the like may be set as an indispensable condition or a non-indispensable condition. The indispensable condition and the non-indispensable condition of each application only needs to be set as appropriate in accordance with the application, and the setting can be changed as appropriate. Moreover, whether a condition is set as an indispensable condition or a non-indispensable condition of an application may be set, as appropriate, and the setting can be changed as appropriate. However, the indispensable condition is to have a request degree higher than the non-indispensable condition.

In this exemplary embodiment, information processing terminal 10 finishes the application that is being executed and that competes with the condition not depending on the display requested by the new application, and information processing terminal 10 determines the display on which the new application is to be activated using the condition depending on the display or another condition not depending on the display requested by the new application as illustrated at Steps 902 to 906. As a result, according to this exemplary embodiment, such an effect can be obtained that the display on which the application is to be activated can be determined by considering a plurality of conditions at the same time. This effect is obtained from the processing at Steps 902 to 906 and can be also obtained even if other Steps added to FIG. 12 are omitted or replaced by another processing.

In this exemplary embodiment, the example in which the real-time amount of resources that are consumed is used as the system load value is shown, but the present invention is not limited to this. As the system load value, the amount of resources that are consumed used in determination of the first to third conditions in the first exemplary embodiment or a combination thereof can be used.

By using the first condition as an example, the total sum of the statistic amount of resources that were consumed by newly activated application in the past and the current amount of resources that are consumed by the application that is being executed on the surface of the other display, may be used as the system load value. By using the second condition as an example, the total sum of the past statistic amount of resources that were consumed by the application that is to be newly activated and the past statistic amount of resources that were consumed by the application that is being executed on the surface of the other display may be used as the system load value. By using the third condition as an example, when the display application on the other display is finished after a new application is activated on either display 11 or 12, the total sum of the amount of resources that are consumed by the applications on the surfaces of two displays 11 and 12, may be used as the system load value. Moreover, by specifying a plurality of system load values and threshold values corresponding to them, the forced activation processing may be executed if even any one of the system load values exceeds the threshold value.

Moreover, as the system load value of this exemplary embodiment, the device usage rate by the application used in the variation of the second exemplary embodiment can be also used. The usage rate is obtained by dividing the number of times of execution of the application and use of the device by the number of times of execution of the application.

Eighth Exemplary Embodiment

An example in which a condition of how well the characteristics requested by the application are satisfied by displays 11 and 12 is singularly used is illustrated in this exemplary embodiment.

A basic configuration of the information processing terminal according to this exemplary embodiment is the same as that illustrated in FIG. 2. However, display 11 and display 12 have different characteristics. Specifically, display 11 and display 12 have different frame rates. Moreover, a device (not shown) is mounted on housing 14 on which display 12 is mounted. These frame rates and presence of the device are included in the characteristics of displays 11 and 12.

First, an outline of information processing terminal 10 of this exemplary embodiment will be described.

Displays 11 and 12 have characteristics different from each other and are display devices such as liquid crystal or the like, each displaying an application screen, and a screen of the application that is being executed is displayed on each of them.

Control unit 15 activates the new application on the display having a characteristic satisfying the request condition on the basis of the characteristic of each of two displays 11 and 12 and the request condition of the new application to be activated.

According to this exemplary embodiment, an application can be executed on an appropriate display suitable for a request in information processing terminal 10 that is provided with two displays 11 and 12 having different characteristics.

It is assumed that the request conditions of this exemplary embodiment include indispensable conditions that should be satisfied without fail and the non-indispensable conditions which are preferably satisfied but do not need satisfied. Control unit 15 may determine to activate a new application on a display satisfying the indispensable condition if there is one display that satisfies the indispensable condition of the new application. On the other hand, if both two displays 11 and 12 satisfy the indispensable condition, control unit 15 may select either of the displays based on the non-indispensable condition of the application so as to activate the application.

Moreover, control unit 15 determines the display on which the new application is to be activated on the basis of both of the request condition of the application that is being executed and the request condition of the new application if another application that is being executed on the display satisfying the request condition of the new application. For example, if both displays 11 and 12 satisfy the indispensable condition of the new application and both have application that are being executed, control unit 15 may calculate points of each display using a degree of satisfying the request condition of the new application as a positive factor and a degree of satisfying the request condition of the application that is being executed as a negative factor and may only determine on which display the new application is to be activated on the basis of the points.

Moreover, control unit 15 may only move the application that is being executed to the other display if the characteristic of the other display satisfies the request condition of the application that is being executed when the new application is to be activated on the display on which another application is being executed. To move the application means to move the application screen of the application between the displays. Since the characteristics of two displays 11 and 12 are different, it is likely that operations and convenience of the application may be changed due to the movement of the application.

Moreover, if the characteristic of the other display does not satisfy the request condition of the application that is being executed, control unit 15 will activate the new application without moving the application that is being executed. At this time, the application of the new application is superimposed on the application screen of the application that is being executed. The application having been executed is inactivated, and the new application is brought into an active state.

Furthermore, control unit 15 may change the request condition of the application in an adapted manner on the basis of a use form in the past execution of the application. For example, the request condition of the application using the device in accordance with the request may include a use request degree indicating how much the device is requested. Control unit 15 statistically calculates the use request degree of the device in the application on the basis of presence or absence of use of the device in the past execution of the application. For example, an average value of the achievement value in the past execution is calculated by setting an achievement value, when the device is used, to 1 and by setting the achievement value, when the device is not used, to 0, and that may be used as the use request degree.

Moreover, the request condition of the application using the device may include a device arrangement request degree indicating how much it is requested the application is activated on the display mounted on the same housing as the device. Control unit 15 statistically calculates the device arrangement request degree in the application on the basis of how much it is executed in display 12 mounted on the same housing as the device when the application was executed in the past in comparison with display 11.

When the point of each display described above is to be calculated, calculation can be made such that a value obtained by multiplying the device use request degree by the application by the device arrangement request degree is added to display 12 mounted on the same housing 14 as the device.

Moreover, in the above, when a new application is to be activated on the display on which another application is being executed, the application that is being executed is moved to the other display if possible, but the present invention is not limited to this. As a facilitated operation example, the application that is being executed may be inactivated and the new application may be activated upon that without determining whether or not the movement is possible.

Figure 13:
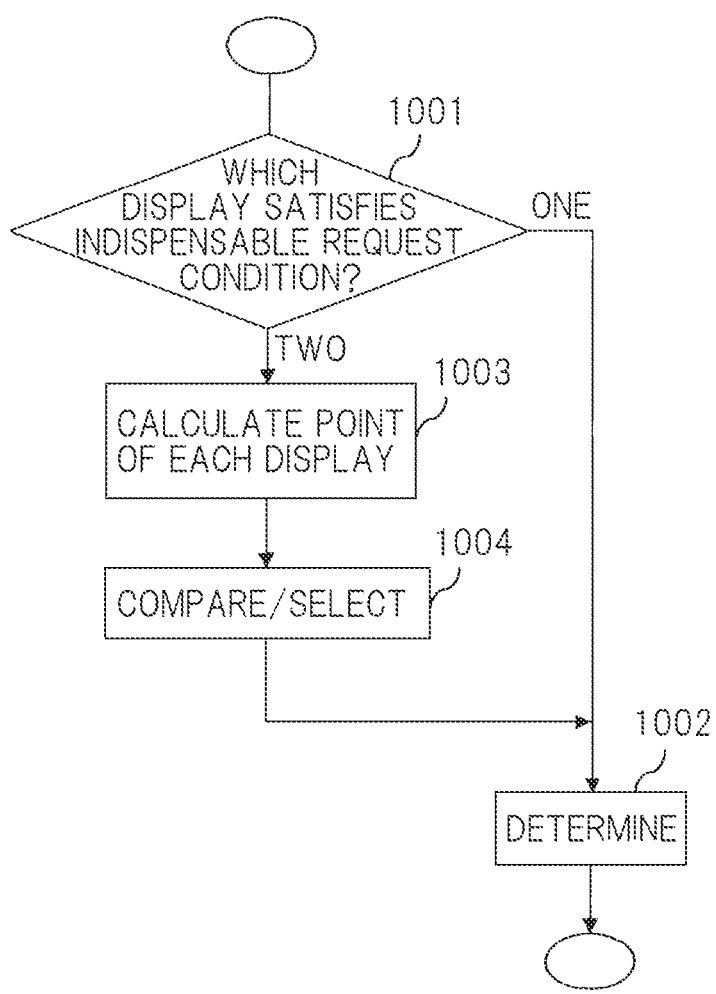
FIG. 13 is a flowchart illustrating an exemplary embodiment relating to processing by the information processing terminal of an eighth exemplary embodiment.
Figures 14, 15:
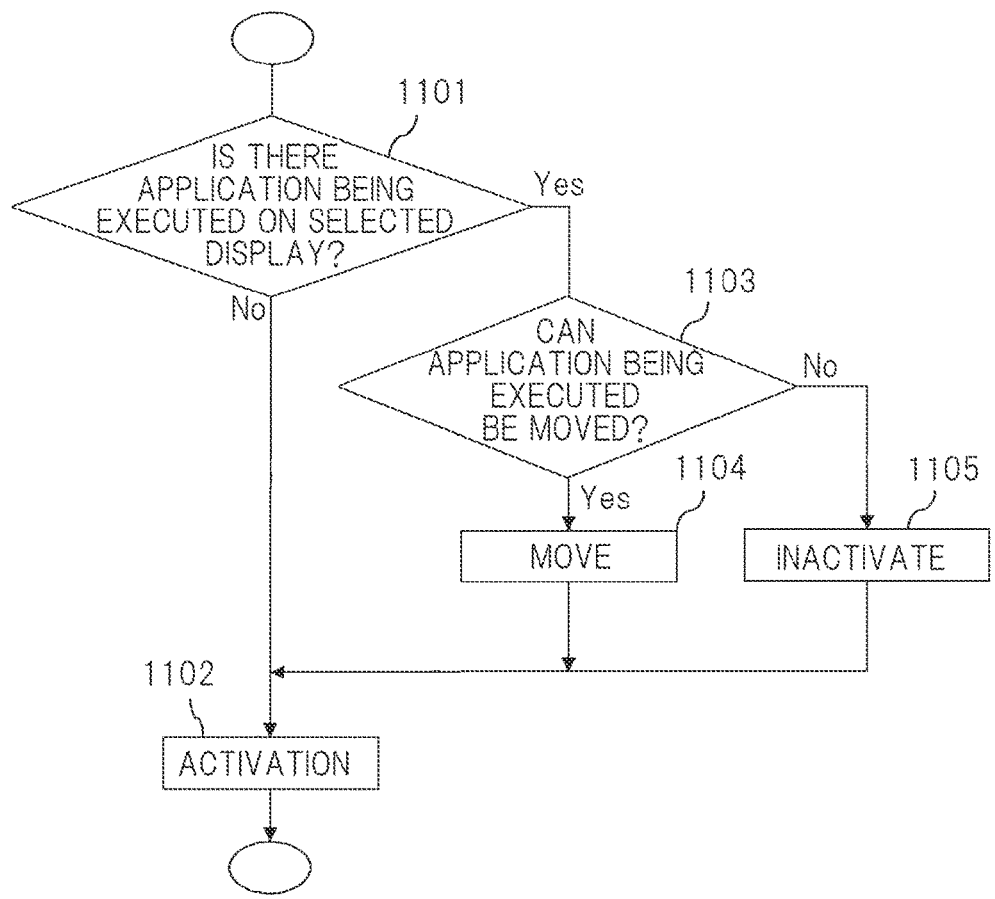
FIG. 14 is a flowchart illustrating an exemplary embodiment relating to processing by the information processing terminal of the eighth exemplary embodiment.
FIG. 15 is a diagram illustrating an example of a table on which is recorded the amount of resources of a plurality of items consumed by an application.

FIGS. 13 and 14 are flowcharts illustrating an exemplary embodiment relating to processing by the information processing terminal of this exemplary embodiment. FIG. 13 illustrates processing when the information processing terminal selects a display on which a new application is to be activated. By referring to FIG. 13, control unit 15 first determines which of the displays satisfies the indispensable condition of the new application (Step 1001). If either one of displays 11 and 12 satisfies the indispensable condition, control unit 15 determines to activate the new application on that display (Step 1002).

If both displays 11 and 12 satisfy the indispensable condition, control unit 15 calculates a point to be used as an index for selecting a display on which the new application is to be activated for each of displays 11 and 12 (Step 1003). The point of the display indicates a degree of preference of activating the new application on that display.

In calculation of this point, the presence of an application that is being executed is also considered. For example, assume that the degree by which the display satisfies the request condition of the new application is A and the degree by which the display satisfies the request condition of the application that is being executed is B. In this case, the point P of the display is $P = A - \alpha B$. $\alpha$ indicates a weight factor. If a policy states that priority is given to a new application over the application that is being executed, it is only necessary that α is set to a value smaller than 1.

After points of both displays 11 and 12 are calculated, then, control unit 15 selects the display with the largest point (Step 1004) and determines to activate the new application on the selected display (Step 1002).

When the display on which the new application is to be activated is determined, then, the application is activated.

By referring to FIG. 14, when the application is activated, control unit 15 first determines whether or not there is an application that is being executed on the selected display (Step 1101). If there is no application that is being executed on the selected display, control unit 15 activates the application (Step 1102).

On the other hand, if there is an application that is being executed on the selected display, control unit 15 determines whether or not the application that is being executed can be moved to the other display (Step 1103). Specifically, availability of movement may be determined on whether or not the characteristic of the other display satisfies the request condition of the application that is being executed. Moreover, if still another application is being executed on the other display at that time, such determination may be made that movement is not possible.

If the application that is being executed on the display on which the new application is to be activated can be moved to the other display, control unit 15 moves the application that is being executed between the displays (Step 1104) and then, activates the new application (Step 1102).

On the other hand, if the application that is being executed on the display on which the new application is to be activated cannot be moved to the other display, control unit 15 inactivates the application that is being executed (Step 1105) and activates the new application (Step 1102).

As an example of the above-described device, a camera, a GPS (Global Positioning System), an acceleration sensor and the like can be cited. In the case of an application in which the direction of the display is preferably equal to the direction of a camera, the display being mounted on the same housing as the camera becomes a request condition. In the case of an application which displays a map on the display so as to match a position and an azimuth obtained by GPS, the display being mounted on the same housing as the GPS becomes a request condition. In the case of an application which operates in accordance with an attitude change of the display, the display being mounted on the same housing as the acceleration sensor becomes a request condition.

Moreover, in this exemplary embodiment, the example in which information processing terminal 10 changes the request condition of the application in the adapted manner is shown, but the present invention is not limited to this. As another example, the request condition of an application may be a fixed value set in advance. Moreover, the fixed value may be set by an application developer or may be set by a user of information processing terminal 10.

In the above-described first to seventh exemplary embodiments, the case in which a resource or a device which is a resource is singular is assumed to facilitate explanation. However, in actuality, as the type of resources that can take an intermediate consumption amount, there are usually a plurality of resources independent from each other such as the processing capability of the CPU, the processing capability of the GPU, the memory capacity and the like. Moreover, as the type of resources for which usage thereof is determined, there are usually a plurality of resources independent from each other such as a camera, a GPS, a sensor, a communication device and the like.

FIG. 15 is a diagram illustrating an example of a table on which is recorded the amount of resources of a plurality of items consumed by an application. In this example, a current value (real) and an average value (average) of the amount of each resource that are consumed are measured for each application.

For example, it is only necessary that information processing terminal 10 measures the amount of resources that are consumed at constant intervals and sets the latest measurement value to a current value (real). Moreover, an average of measurement values for a predetermined number of times in the past may be set to an average value (average).

By referring to FIG. 15, the resources include the processing capability of the CPU (CPU), the memory capacity (Memory), and the frame rate of an image (Frame rate) for which the amount of resources that are consumed are measured as load values, and an electron compass (Electron compass), an acceleration sensor (acceleration sensor), and a camera (camera) for which the amount of resources that are consumed are fixed as presence or absence of use. An average of the amount of resources that are consumed is fixed as presence or absence of use is indicated by probability of use in each activation in the past.

If there are a plurality of resources as above, information processing terminal 10 may only determine the display on which the application screen of a newly activated application is displayed so that the total sum of the amount of all the resources of the type that can take an intermediate consumption amount does not exceed a threshold value and so that competition among the applications does not occur for all the resources of the type for which presence or absence of use is fixed. Alternatively, the total sum of the amount of all the resources of the type that can take an intermediate consumption amount may be used as a system load value in the seventh exemplary embodiment.

Moreover, if there are a plurality of resources, each resource may be weighted. For example, the amount of each resource that is consumed is calculated, the amount is subjected to weighted addition with a weighting coefficient of each resource, and an obtained result may be compared with the threshold value. Alternatively, the result obtained by the weighted addition may be used as a system load value in the seventh exemplary embodiment. Alternatively, a resource given priority is fixed for each application, and a weighting coefficient may be set for each application and for each resource. For example, in the case of an application with an emphasis on an operation speed such as a response to a user operation, for example, the weighting coefficient of the processing capability of the CPU or the memory capacity can have a large value. In that case, the amount of each resource that is consumed by each application may be subjected to weighted addition with a weighting coefficient for each application and for each resource, and the obtained result may be compared with the threshold value.

At that time, in the case of the resources of the type for which presence or absence of use is fixed, it may be so set that the amount that is consumed is zero when not in use and the amount that is consumed when in use is the maximum value so as to calculate the consumption amount. Alternatively, as an average value of the amount of resources that are consumed of the type for which presence or absence of use is fixed, a past use frequency may be used.

Moreover, the weight in each application for the resources of the type for which presence or absence of use is fixed may be fixed by how much use of the resource is required by the application. For example, in the case of an application for which a camera which is one of resources is indispensable, the weighting coefficient for the camera in that application can have a large value.

Moreover, in the screen display control illustrated in FIG. 4, first, determination is made on the first condition based on the real time situation and then, determination is made on the second condition based on a statistic value represented by an average value, and finally, determination is made on the third condition considering a latent application hidden below another application. However, the present invention is not limited to this, and determination may be made in any order of the first to third conditions.

As still another example, the determination based on the real time situation and the determination based on the statistic value may be integrated into one determination. The amount of resources that are consumed and calculated from the real time situation and the amount of resources that are consumed and calculated from an average value can be subjected to weighted addition with a predetermined weighting coefficient, and the result can be compared with the threshold value. In that case, the weight to the amount of resources that are consumed on the real time basis can have a value larger than the weight for the amount of resources that are consumed based on the average value. Alternatively, the amount of resources that are consumed by the latent application that is hidden below another application may be subjected to weighted addition.

Moreover, as still another example, regarding the resources of the type that can take an intermediate consumption amount, the amount of resources that are consumed by each application is set in advance in a fixed manner so that the entire amount of resources that are consumed by information processing terminal 10 may be calculated on the basis of the set value and which application is being executed and compared with the threshold value. This set value may be fixed by an application developer at development of the application, may be fixed by the developer of information processing terminal 10 after that, or may be set by a user when the application is installed in information processing terminal 10. According to this, there is no need to measure an actual consumption amount of the resources of the type that can take an intermediate consumption amount on the real time basis or to continuously calculate an average value of the past consumption amount.

Moreover, under the first condition illustrated in the example in FIG. 4, a statistic amount of the amount of resources that were consumed by the application that is to be newly activated in the past and the current amount of resources that are consumed by the application that is being executed on the surface of the other display are added together, and the result is used as the total sum of the amount of resources that are consumed. Since the amount of resources consumed by the application on the surface occupies the most of the whole, this method was adopted. However, the present invention is not limited to this. As another example, since a latent application not on the surface also consumes the resource, the amount of resources that are consumed thereof may be also added and included in the total sum of the amount of resources that are consumed.

According to the above, the amount of resources that are consumed can be reflected in the processing of selecting the display on which the application is to be activated more accurately. In general applications, the amount of resources that are consumed when the application is a latent application is sufficiently smaller than the amount of resources that are consumed when the application is a display application, but there are applications that are not of that type.

An application that consumes a large amount of resources is referred to as a background processing application even if it is a latent application. The background processing applications include an application for recording images, an application for updating software, an application for reproducing music and the like, for example. When the total sum of the amount of resources that are consumed is to be obtained, the amount of resources that are consumed by only the background processing application in the latent applications may be included in the total sum of the amount of resources that are consumed.

According to that, since the amount of resources that are consumed by all the latent applications need not to be added, calculation processing is reduced, and moreover, since only the background processing application consumes a large amount of resources in the latent applications can be included in the total sum of the amount of resources that are consumed, the total sum of the amount of resources that are consumed can be brought closer to an accurate value. As the amount of resources that are consumed by the background processing application, the actually measured consumption amounts and their average value may be used, for example, or a given value fixed in advance may be used. Moreover, the background processing application does not necessarily belong to either of the displays. There is a background processing application executing processing in a state that does not belong to either of the displays. The amount of resources that are consumed by such background processing application may be included in the total sum of the amount of resources that are consumed.

Moreover, the type, the characteristics, and the operating state of the application are not particularly considered in each of the above exemplary embodiments, but information processing terminal 10 may determine the display on which a new application is to be activated by considering the type or characteristics of the application. Specifically, if the application is downloading data, information processing terminal 10 may give priority to that application and may activate the new application on the other application so that the downloading is not interrupted.

Moreover, in each of the above-described exemplary embodiments, when the application is finished, information processing terminal 10 calculates the total sum of the amount of resources that are consumed in a new state after the application is finished, and if the total sum exceeds the threshold value, information processing terminal 10 may control the application that is being executed so that the threshold value is not exceeded. For example, when the display application is to be finished, information processing terminal 10 may move another application that is being executed between the displays, inactivate the application on the surface of one of the displays and the like.

More specific examples will be described below. Here, an example relating to the first exemplary embodiment will be exemplified.

A change in the display on displays 11 and 12 when a new application is to be activated will be described.

Figure 16A:
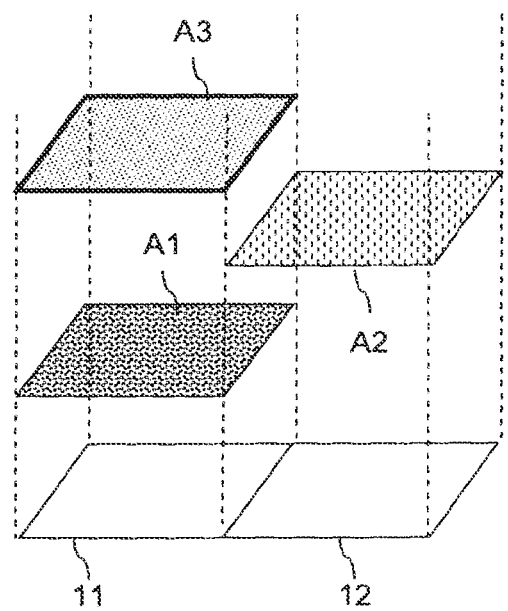
FIG. 16A is a diagram illustrating an example of a change in display of an application screen by the information processing terminal.
Figure 16B:
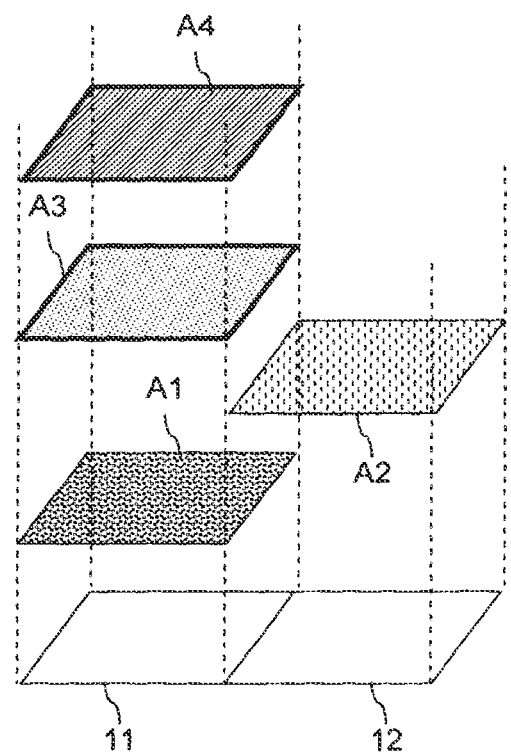
FIG. 16B is a diagram illustrating an example of a change in display of the application screen by the information processing terminal.

FIGS. 16A and 16B are diagrams illustrating an example of a change in the display of the application screen by the information processing terminal. In a state in FIG. 16A, information processing terminal 10 is executing applications A1 and A3 on display 11 and is executing application A2 on display 12. On display 11, application A3 is on the surface and application A1 is hidden below that. Moreover, application A3 is assumed to consume a larger amount of resources than the other applications. The application is surrounded by a bold framework in the figure in order to indicate that the amount of resources consumed by the application is larger.

It is assumed that activation of new application A4 is requested from the state in FIG. 16A. Also assume that this application A4 also consumes a large amount of resources. Information processing terminal 10 receives the request and determines on which of displays 11 and 12 application A4 is to be activated.

Here, if application A4 is activated on display 12, application A3 and application A4 that consumes a larger amount of resources are both on the surface of the display and thus, it is assumed that the entire amount of resources that are consumed becomes larger than the threshold value on the first or second condition. On the other hand, if application A4 is activated on display 11, application A3 that consumes a large amount of resources is hidden below application A4 and thus, it is assumed that the entire amount of resources that are consumed becomes smaller than the threshold value. Thus, information processing terminal 10 determines that application A4 is to be activated on display 11 as illustrated in FIG. 16B.

Figure 17A:
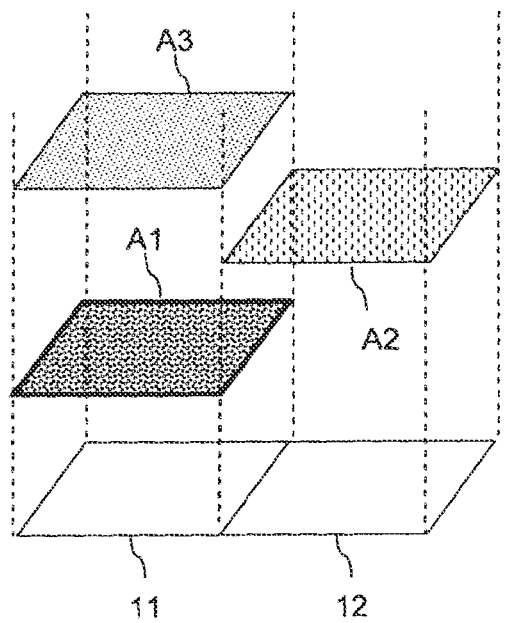
FIG. 17A is a diagram illustrating another example of a change in display of the application screen by the information processing terminal.
Figure 17B:
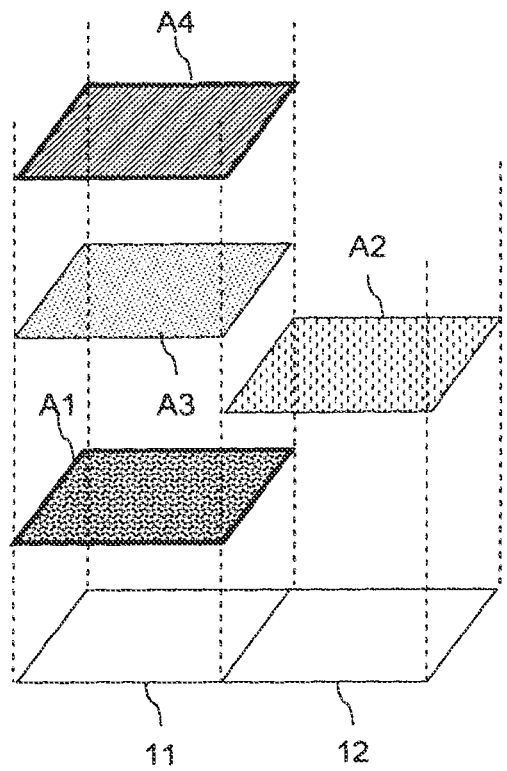
FIG. 17B is a diagram illustrating another example of a change in display of the application screen by the information processing terminal.

FIGS. 17A and 17B are diagrams illustrating another example of a change in the display of the application screen by the information processing terminal. In a state in FIG. 17A, information processing terminal 10 is executing applications A1 and A3 on display 11 and is executing application A2 on display 12. On display 11, application A3 is on the surface and application A1 is hidden below that. Moreover, application A1 is assumed to consume a large amount of resources in this example.

Assume that activation of new application A4 is requested from the state in FIG. 17A. Assume that this application A4 also consumes a large amount of resources. Information processing terminal 10 receives the request and determines on which of displays 11 and 12 application A4 is to be activated.

Here, whichever of display 11 or display 12 application A4 is to be activated on, application A1 that consumes a large amount of resources is hidden, and thus, it is assumed that the entire amount of resources that are consumed is smaller than the threshold value on the first and second conditions.

Thus, information processing terminal 10 subsequently determines on which of displays 11 and 12 application A4 is to be activated by considering the latent application based on the third condition.

Here, if application A4 is activated on display 12, when application A3 on the surface of display 11 is finished after that, application A1 and application A4 come to the surface. Since both application A1 and application A4 consume a large amount of resources, the entire amount of resources that are consumed becomes larger than the threshold value.

On the other hand, if application A4 is activated on display 11, even if application A4 on the surface of display 11 is finished after that or even if application A2 on the surface of display 12 is finished, the entire amount of resources that are consumed is kept smaller than the threshold value.

Thus, information processing terminal 10 determines that new application A4 is to be activated on display 11.

The exemplary embodiments and examples have been described, but the present invention is not limited to these exemplary embodiments and examples but may be used in combination of various configurations or a part of the configuration may be changed within a range of the technical idea of the present invention.

This application claims priority of Japanese Patent Application No. 2010-088552 filed on Apr. 7, 2010 and incorporates the whole of the disclosure herein by reference.

The invention claimed is:

1. An information processing terminal comprising:
   a plurality of displays that respectively display an application screen; and
   control unit configured to determine a display, on which a new application is to be activated, from among said plurality of displays, based on an amount of resources consumed by said information processing terminal,
   wherein when the new application is allowed to be activated on any of said plurality of displays based on of the amount of resources consumed by said information processing terminal, said control unit activates the new application on one of the plurality of displays on which an application, that uses a device to be occupied by the new application, is being executed.

2. The information processing terminal according to claim 1, wherein
   the amount of resources consumed by said information processing terminal is determined by an amount of the resources consumed by an application that is being executed on at least one of said plurality of displays and by an amount of resources consumed by the new application.

3. The information processing terminal according to claim 2, wherein
   said control unit selects a display on which the new application is to be activated so that a sum of the amount of the resources consumed by the application that is being executed and the amount of the resources consumed by the application that is to be newly activated does not exceed a threshold value.

4. The information processing terminal according to claim 1, wherein
   the amount of resources consumed by said information processing terminal is determined by one or two or all of:
   when the new application is to be activated on a display, a sum of a statistic amount of resources consumed by the new application and a current amount of resources consumed by an application that is being executed on surfaces of other displays of the plurality of displays;
   when the new application is to be activated on a display, a sum of the statistic amount of resources consumed by the new application and a statistic amount of resources consumed by the application that is being executed on the surfaces of other displays of the plurality of displays; and
   when the new application is to be activated on a display and when a plurality of applications are to be executed on one display, a sum of the statistics amounts of resources consumed by an application which comes to the surface of the display when an application on the surface of the display is finished and by the new application.

5. The information processing terminal according to claim 1, wherein
   when the new application is to be activated on the determined display, said control unit reduces the amount of resources consumed by said information processing terminal by controlling a state of an application that is being executed.

6. The information processing terminal according to claim 5, wherein
said control unit reduces the amount of resources consumed by said information processing terminal by performing at least one of finishing an application that is being executed, moving the application that is being executed between the displays, and bringing the application that is being executed into an inactive state.

7. The information processing terminal according to claim 1, wherein
when the new application is allowed to be activated on any of said plurality of displays based on the amount of resources consumed by said information processing terminal, said control unit activates the new application on a display on which an application, that has a possibility to use a resource to be occupied by the new application, is being executed.

8. The information processing terminal according to claim 1, wherein
when the new application is allowed to be activated on any of said plurality of displays based on the amount of resources consumed by said information processing terminal, said control unit activates the new application on a display on which an application, that has a possibility to use a resource to be occupied by the new application, is being latently executed without being displayed.

9. The information processing terminal according to claim 1, wherein when a display having a different characteristics is included is said plurality of displays, said control unit determines a display on which the new application is to be activated by giving priority to a display with a characteristics suitable for the new application over other displays of the plurality of displays.

10. The information processing terminal according to claim 1, wherein
when first and second applications are associated with each other, when the first application is activated and control of the second application is allowed based on the amount of resources consumed by said information processing terminal, said control unit brings the second application to a surface of the display if the second application is being executed on any one of the displays of the plurality of displays, and said control unit activates the second application together with the first application if the second application is not being executed.

11. The information processing terminal according to claim 10, wherein
said control unit determines displays of the plurality of displays on which the first and second applications are to be activated, respectively, based on the amount of resources consumed by said information processing terminal when an application in the first and second applications assumed to be finished first is finished.

12. A method of controlling an information processing terminal provided with a plurality of displays that respectively display an application screen, the method comprising:
determining a display on which a new application is to be activated from among said plurality of displays based on an amount of resources consumed by said information processing terminal,
wherein when the new application is allowed to be activated on any of said plurality of displays based on the amount of resources consumed by said information processing terminal, activating the new application on a display of the plurality of displays on which an application, that uses a device to be occupied by the new application, is being executed.

\* \* \* \* \*